(12) United States Patent
Takizawa et al.

(10) Patent No.: US 10,802,105 B2
(45) Date of Patent: Oct. 13, 2020

(54) LOCATION ESTIMATION DEVICE

(71) Applicant: A School Corporation Kansai University, Suita-shi, Osaka (JP)

(72) Inventors: Yasuhisa Takizawa, Suita (JP); Takamasa Kitanouma, Suita (JP)

(73) Assignee: A SCHOOL CORPORATION KANSAI UNIVERSITY, Osaka (JP)

( * ) Notice: Subject to any disclaimer, the term of this patent is extended or adjusted under 35 U.S.C. 154(b) by 0 days.

(21) Appl. No.: 16/302,282

(22) PCT Filed: May 16, 2017

(86) PCT No.: PCT/JP2017/018411
§ 371 (c)(1),
(2) Date: Nov. 16, 2018

(87) PCT Pub. No.: WO2017/199972
PCT Pub. Date: Nov. 23, 2017

(65) Prior Publication Data
US 2019/0219663 A1   Jul. 18, 2019

(30) Foreign Application Priority Data
May 18, 2016   (JP) ................................. 2016-099547

(51) Int. Cl.
*H04W 24/00* (2009.01)
*G01S 5/02* (2010.01)
(Continued)

(52) U.S. Cl.
CPC ........... *G01S 5/0289* (2013.01); *H04W 4/023* (2013.01); *H04W 64/00* (2013.01);
(Continued)

(58) Field of Classification Search
CPC ... H04W 84/18; H04W 80/04; H04W 72/085; H04W 84/12; H04W 16/24; H04W 28/26;
(Continued)

(56) References Cited

U.S. PATENT DOCUMENTS

2003/0151513 A1   8/2003   Herrmann et al.
2003/0152041 A1   8/2003   Herrmann et al.
(Continued)

FOREIGN PATENT DOCUMENTS

CN   104683954 A   6/2015
JP   2004-356950 A   12/2004
(Continued)

OTHER PUBLICATIONS

Official Communication issued in International Patent Application No. PCT/JP2017/018411, dated Aug. 15, 2017.
(Continued)

*Primary Examiner* — Joseph Arevalo
(74) *Attorney, Agent, or Firm* — Keating & Bennett, LLP

(57) ABSTRACT

In a location estimation device 5, a location updater 63 acquires an estimated location of each fixed node based on a fixed topology indicating an arrangement relationship among fixed nodes and a temporal self-location of each fixed node. A topology conflict determiner 65 calculates a region determination value indicating a frequency of occurrence of a topology conflict using the estimated location of each fixed node that is estimated based on the fixed topology. A virtual topology producer 66 produces a virtual topology by virtually changing a wireless communication distance between fixed nodes. The virtual topology producer 66 specifies one topology from among a fixed topology and a plurality of virtual topologies based on a region determination value corresponding to the fixed topology and a plurality of region determination values corresponding to the plurality of vir-
(Continued)

tual topologies, and outputs a location of each fixed node that is estimated based on the specified topology as a result of location estimation of each fixed node.

4 Claims, 24 Drawing Sheets

(51) Int. Cl.
  *H04W 84/18* (2009.01)
  *H04W 64/00* (2009.01)
  *H04W 4/02* (2018.01)
  *H04W 84/00* (2009.01)

(52) U.S. Cl.
  CPC ......... *H04W 64/003* (2013.01); *H04W 84/18* (2013.01); *G01S 5/02* (2013.01); *H04W 84/005* (2013.01)

(58) Field of Classification Search
  CPC ..... H04W 40/02; H04W 40/24; H04W 4/023; H04W 64/00; H04W 72/0406
  USPC ................ 455/456.1, 509, 452.2, 515, 446
  See application file for complete search history.

(56) References Cited

U.S. PATENT DOCUMENTS

| | | |
|---|---|---|
| 2006/0039300 A1 | 2/2006 | Ogier et al. |
| 2007/0077926 A1 | 4/2007 | Manjeshwar et al. |
| 2008/0274701 A1 | 11/2008 | Manjeshwar et al. |
| 2009/0103456 A1 | 4/2009 | Herrmann et al. |
| 2015/0133081 A1* | 5/2015 | Griot ................ H04M 15/00 455/407 |
| 2016/0057583 A1* | 2/2016 | Nguyen .............. H04W 4/029 370/329 |
| 2016/0061933 A1* | 3/2016 | Chung ................ G01S 11/08 455/456.1 |
| 2017/0180938 A1* | 6/2017 | Smith ................. H04W 4/025 |
| 2017/0311290 A1* | 10/2017 | Adjakple ............ H04W 48/00 |
| 2019/0219663 A1* | 7/2019 | Takizawa ........... G01S 5/0289 |

FOREIGN PATENT DOCUMENTS

| | | |
|---|---|---|
| JP | 2005-515696 A | 5/2005 |
| JP | 2006-003187 A | 1/2006 |
| JP | 2008-306532 A | 12/2008 |
| JP | 2017-108257 A | 6/2017 |

OTHER PUBLICATIONS

Kitanouma et al., "Cloud-based Self-Organizing Localization for Wireless Sensor Networks in Mixture Environments of LOS and NLOS and Its Accuracy", Transactions of Information Processing Society of Japan, vol. 57, No. 2, Feb. 2016, 14 pages.

Kitanouma et al., "Implementation of Integrated Self-Organizing Localization in Wireless Sensor Network", IPSJ SIG Technical Reports, vol. 2015-DPS-162, No. 17, Mar. 5, 2015, 11 pages.

* cited by examiner

FIG. 2

NEIGHBOR NODE INFORMATION  21M

SELF-DEVICE IDENTIFICATION INFORMATION : Address M-1
DETECTED ACCELERATION : 2.0 (m/sec$^2$)

NEIGHBOR NODES

IDENTIFICATION INFORMATION : Address N-1 (FIXED NODE N-1)
IDENTIFICATION INFORMATION : Address N-5 (FIXED NODE N-5)
IDENTIFICATION INFORMATION : Address M-2 (MOVING NODE M-2)

F I G. 1 1
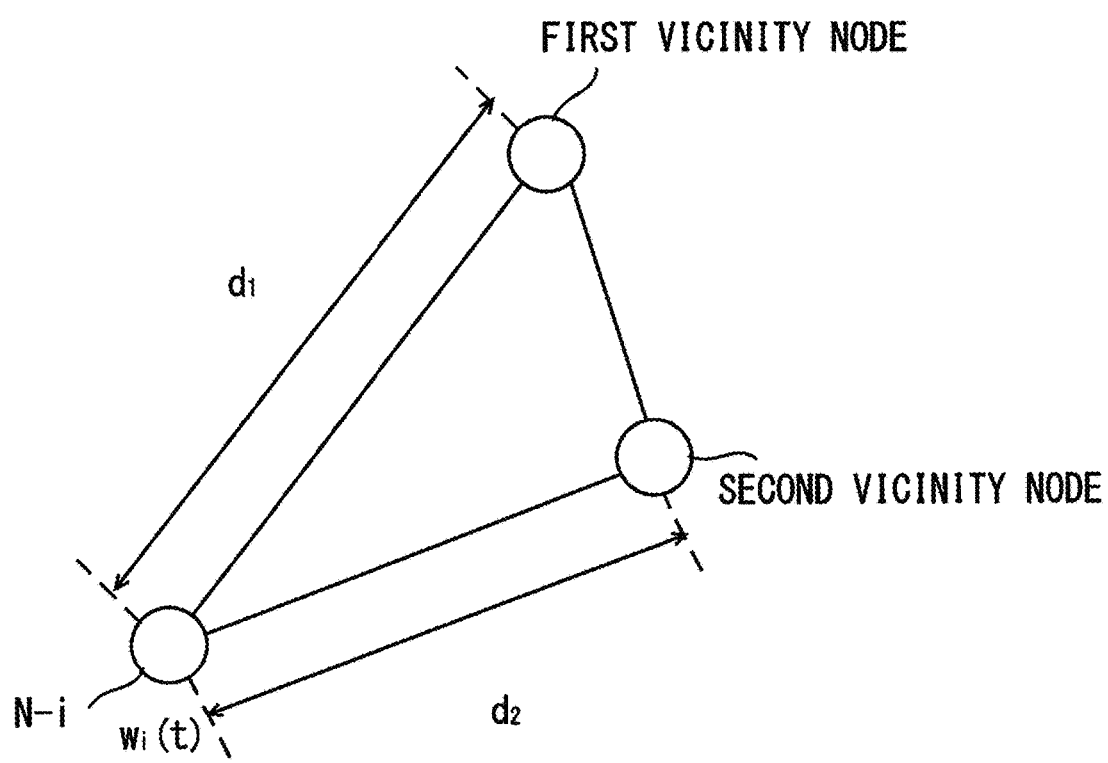

FIG. 12
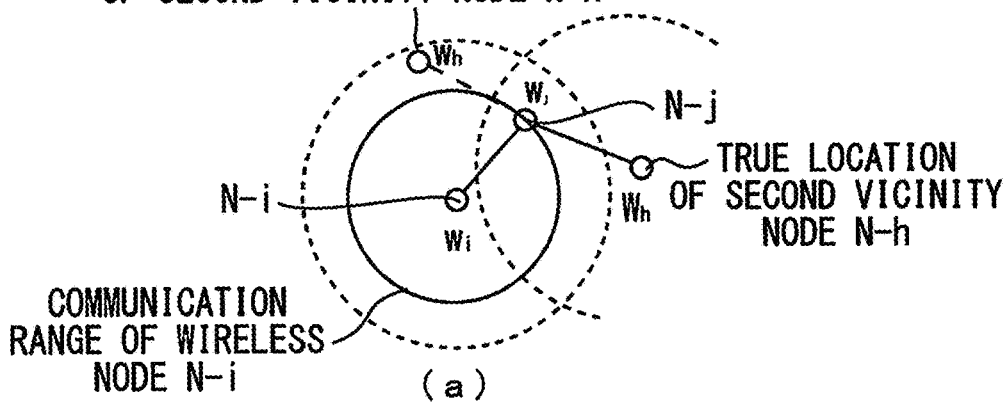
(a)
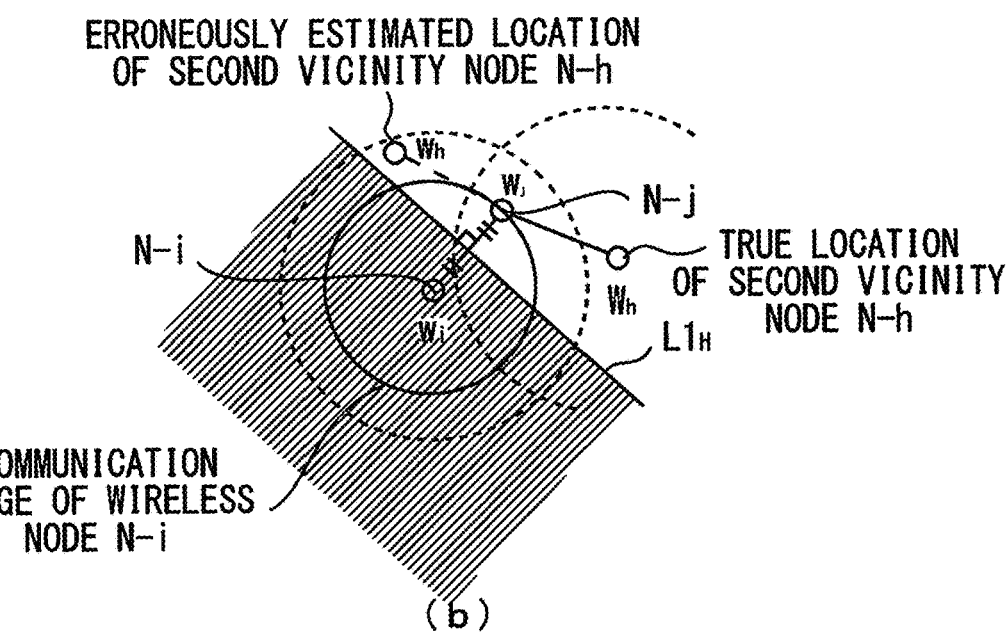
(b)
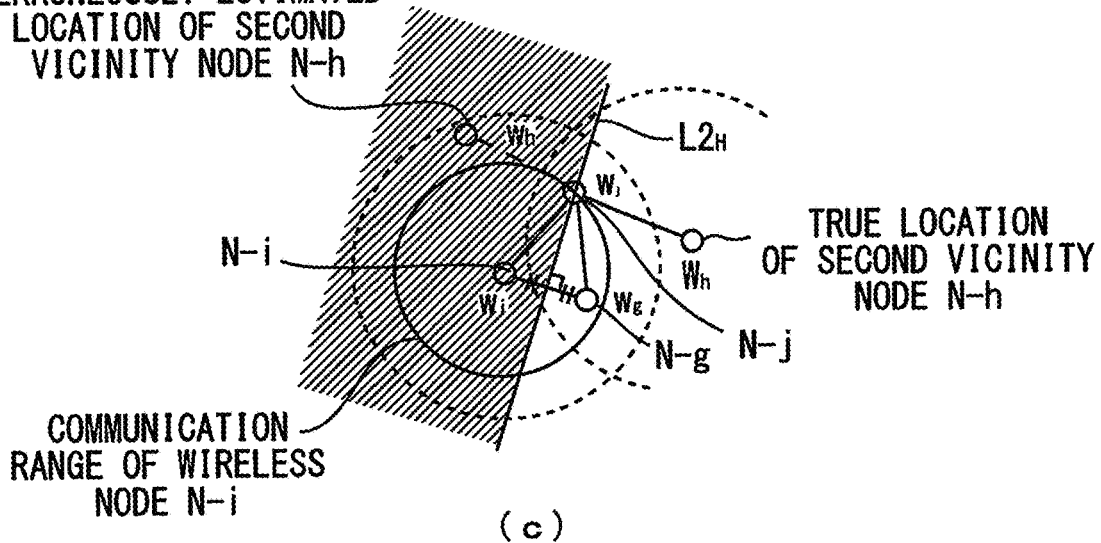
(c)

R11 : RANGE OF FIRST VICINITY NODES
R12 : RANGE OF SECOND VICINITY NODES

LOCATION ESTIMATION DEVICE

TECHNICAL FIELD

The present invention relates to a location estimation device that estimates a location of a wireless node using a self-organizing map.

BACKGROUND ART

In a wireless sensor network constituted by a plurality of wireless nodes, the locations of the wireless nodes are important information as acquisition locations of sensing data of sensors provided in the wireless nodes. Conventionally, Self-Organizing Localization (SOL) using a self-organizing map (SOM) has been known as the method for estimating the locations of the wireless nodes.

With the SOL, locations can be estimated with high accuracy using very few anchor nodes and no distance measurement device. Further, with SOL, location accuracy is not degraded as much even in the mixture environment of Line-Of-Sight (LOS) and Non-Line-Of-Sight (NLOS) due to obstacles (see non-patent document 1.)

PATENT DOCUMENTS

Non-Patent Document 1: Takamasa Kitanouma, Yuto Takashima, Naotoshi Adachi and Yasuhisa Takizawa, "Location estimation method using Intensive Self-Organizing Localization for Wireless Sensor Networks in Mixture Environments of NLOS and Its Accuracy Evaluation", Information Processing Society of Japan Journal, Vol. 57, No. 2, 494-506

SUMMARY OF THE INVENTION

Problems to be Solved by the Invention

When locations of wireless nodes are estimated using a location estimation method based on the conventional SOL, a topology conflict where the estimated location of a wireless node is closer to a second vicinity node than a first vicinity nodes may occur. When a topology conflict occurs, the location of one of wireless nodes, first vicinity nodes and second vicinity nodes may be erroneously estimated, so that a location estimation process is performed again.

However, when the location estimation process is performed again, a new topology conflict may occur. With the location estimation method based on the conventional SOL, it was difficult to prevent an occurrence of a topology conflict. Therefore, it was difficult to improve the accuracy of location estimation of wireless nodes.

As such, an object of the present invention is to provide a location estimation device capable of estimating a location of a wireless node in consideration of the above-mentioned problems.

Means for Solving the Problems

A location estimation device according to the present invention includes an acquirer, a fixed topology producer, a self-location producer, a location updater, a topology conflict determiner and a virtual topology producer. The acquirer acquires neighbor node information, which is information of first vicinity nodes present at a distance of 1 hop from one wireless node, from each of m (m is an integer that is equal to or larger than 4) wireless nodes. The fixed topology producer produces a fixed topology indicating an arrangement relationship among the m wireless nodes based on neighbor node information about each of the m wireless nodes. The self-location producer produces temporal self-locations of the m wireless nodes. The location updater estimates locations of the m wireless nodes by updating the temporal self-locations of the m wireless nodes based on the fixed topology. The topology conflict determiner determines presence or absence of a topology conflict indicating that a location of one wireless node estimated by the location updater is closer to a wireless node that is present at a distance of two hops from the one wireless node than a wireless node that is present at a distance of one hop from the one wireless node, and calculates a region determination value that corresponds to the fixed topology and indicates a frequency of occurrence of a topology conflict in the m wireless nodes. The virtual topology producer sets a virtual wireless communication distance between two wireless nodes that are present at a distance of one hop from each other, resets first vicinity nodes that are present at a distance of one hop from the one wireless node based on the virtual wireless communication distance and produces at least one virtual topology that indicates a virtual arrangement relationship among the m wireless nodes based on the reset first vicinity nodes. The location updater estimates locations of the m wireless nodes based on each of the at least one virtual topology. The topology conflict determiner calculates a region determination value corresponding to each of the at least one virtual topology based on the estimated locations of the m wireless nodes corresponding to each of the at least one virtual topology. The virtual topology producer outputs either the estimated locations of the m wireless nodes that are estimated based on the fixed topology or the estimated locations of the m wireless nodes that are estimated based on each of the at least one virtual topology as a result of location estimation of the m wireless nodes based on a region determination value corresponding to the fixed topology and a region determination value corresponding to each of the at least one virtual topology.

Preferably, in the location estimation device, the topology conflict determiner includes a determination value comparer, a distance comparer and a distance setter. The determination value comparer compares a current region determination value that is last received from the topology conflict determiner with a region determination value that is input immediately prior to the current region determination value. The distance comparer compares a virtual wireless communication distance used in a first topology corresponding to the immediately prior region determination value with a virtual wireless communication distance used in a second topology corresponding to the current region determination value. The distance setter sets a virtual wireless communication distance to be used for production of a new virtual topology based on a result of comparison between the current region determination value and the immediately prior region determination value by the determination value comparer and a result of comparison between the virtual wireless communication distance used in the first topology and the virtual wireless communication distance used in the second topology by the distance comparer.

Preferably, in the location estimation device, the distance setter makes the virtual wireless communication distance used for the production of the new virtual topology be smaller than the virtual wireless communication distance used in the second topology when the distance comparer makes a judgement that the virtual wireless communication distance used in the second topology is smaller than the virtual wireless communication distance used in the first topology, and the determination value comparer makes a judgement that the current region determination value is lower than the immediately prior region determination value. The distance setter makes the virtual wireless communication distance to be used for the production of the new virtual topology be larger than the virtual wireless communication distance used in the second topology when the distance comparer makes a judgement that the virtual wireless communication distance used in the second topology is smaller than the virtual wireless communication distance used in the first topology, and the determination value comparer makes a judgement that the current region determination value is equal to or higher than the immediately prior region determination value.

Preferably, in the location estimation device, the distance setter makes the virtual wireless communication distance to be used for the production of the new virtual topology be smaller than the virtual wireless communication distance used in the second topology when the distance comparer makes a judgement that the virtual wireless communication distance used in the second topology is equal to or larger than the virtual wireless communication distance used in the first topology, and the determination value comparer makes a judgement that the current region determination value is higher than the immediately prior region determination value. The distance setter makes the virtual wireless communication distance to be used for the production of the new virtual topology be larger than the virtual wireless communication distance used in the second topology when the distance comparer makes a judgement that the virtual wireless communication distance used in the second topology is equal to or larger than the virtual wireless communication distance used in the first topology, and the determination value comparer makes a judgement that the current region determination value is equal to or lower than the immediately prior region determination value.

Preferably, the location estimation device further includes a lowest value determiner, a lowest value comparer and an update rate comparer. The lowest value determiner determines a lowest value of a region determination value out of a region determination value corresponding to the fixed topology and region determination values of a first virtual topology to a k-th (k is an integer that is equal to or larger than 2) virtual topology. The lowest value comparer compares a region determination value corresponding to a (k+1)th virtual topology with a lowest value when receiving the new region determination value corresponding to the (k+1)th virtual topology from the topology conflict determiner. The update rate comparer compares an update rate of the lowest value with a predetermined threshold value when the region determination value corresponding to the (k+1)th virtual topology is higher than the lowest value. The virtual topology producer determines to output estimated locations of the m wireless nodes that are estimated based on a topology corresponding to the lowest value as results of location estimation of the m wireless nodes when the update rate comparer determines that the update rate is lower than the threshold value.

Further, a location estimation device according to the present invention includes an acquirer, a fixed node location estimator and a moving node location estimator. The acquirer acquires neighbor node information, which is information of first vicinity nodes that are present at a distance of 1 hop from one wireless node, from each of a moving wireless node that moves in a wireless communication space and m (m is an integer that is equal to or larger than 4) fixed wireless nodes that do not move in the wireless communication space. The fixed node location estimator estimates locations of the m fixed wireless nodes based on neighbor node information about each of the m fixed wireless nodes. The moving node location estimator estimates a location of the moving wireless node based on neighbor node information of the moving wireless node and estimated locations of the m fixed wireless nodes estimated by the fixed node location estimator. The fixed node location estimator includes a fixed topology producer, a first self-location producer and a first location updater. The fixed topology producer produces a fixed topology indicating an arrangement relationship among the m fixed wireless nodes based on the neighbor node information about each of the m fixed wireless nodes. The first self-location producer produces temporal self-locations of the m fixed wireless nodes. The first location updater estimates the locations of the m fixed wireless nodes by updating the temporal self-locations of the m fixed wireless nodes based on the fixed topology. The moving node location estimator includes a moving topology producer, a second self-location producer and a second location updater. The moving topology producer acquires neighbor node information, of a neighbor fixed node that is a fixed wireless node, which is recorded in neighbor node information of the moving wireless node out of the m fixed wireless nodes from the acquirer, and produces a topology of the moving wireless node based on the neighbor node information of the moving wireless node and the neighbor node information of the neighbor fixed node. The second self-location producer produces a temporal self-location of the moving wireless node. The second location updater estimates a location of the moving wireless node by updating a temporal self-location of the moving wireless node based on the moving topology and an estimated location of the neighbor fixed node.

Preferably, in the location estimation device, the number of neighbor node information pieces used for production of the moving topology is smaller than the number of neighbor node information pieces used for production of the fixed topology.

Preferably, in the location estimation device, the acquirer regularly acquires neighbor node information about each of the m fixed wireless nodes and neighbor node information of the moving wireless node. The fixed node location estimator repeatedly estimates locations of the m fixed wireless nodes in a first period. The moving node location estimator repeatedly estimates a location of the moving wireless node in a second period that is shorter than the first period.

Preferably, the fixed topology producer sets neighbor node information of the moving wireless node that has already been used for location estimation of the moving wireless node as neighbor node information of a virtual fixed wireless node, and produces a fixed topology based on neighbor node information about each of the m fixed wireless nodes and neighbor node information of the virtual fixed wireless node.

A location estimation program according to the present invention is a program for allowing a computer to estimate a location of a wireless node. The location estimation program includes an acquiring step, a fixed topology production step, a self-location production step, a location update step, a topology conflict determination step and a virtual topology production step. The acquiring step includes acquiring neighbor node information, which is information of first vicinity nodes present at a distance of 1 hop from one wireless node, from each of m (m is an integer that is equal to or larger than 4) wireless nodes. The fixed topology production step includes producing a fixed topology indicating an arrangement relationship among the m wireless nodes based on neighbor node information about each of the m wireless nodes. The self-location production step includes producing temporal self-locations of the m wireless nodes. The location update step includes estimating locations of the m wireless nodes by updating the temporal self-locations of the m wireless nodes based on the fixed topology. The topology conflict determination step includes determining presence or absence of a topology conflict indicating that a location of one wireless node estimated in the location update step is closer to a wireless node that is present at a distance of two hops from the one wireless node than a wireless node that is present at a distance of one hop from the one wireless node, and calculating a region determination value that corresponds to the fixed topology and indicates a frequency of occurrence of a topology conflict in the m wireless nodes. The virtual topology production step includes setting a virtual wireless communication distance between two wireless nodes that are present at a distance of one hop from each other, resetting first vicinity nodes that are present at a distance of one hop from the one wireless node based on the virtual wireless communication distance and producing at least one virtual topology that indicates a virtual arrangement relationship among the m wireless nodes based on the reset first vicinity nodes. The location update step includes estimating locations of the m wireless nodes based on each of the at least one virtual topology. The topology conflict determination step includes calculating a region determination value corresponding to each of the at least one virtual topology based on the estimated locations of the m wireless nodes corresponding to each of the at least one virtual topology. The virtual topology production step includes outputting either the estimated locations of the m wireless nodes that are estimated based on the fixed topology or the estimated locations of the m wireless nodes that are estimated based on each of the at least one virtual topology as a result of location estimation of the m wireless nodes based on a region determination value corresponding to the fixed topology and a region determination value corresponding to each of the at least one virtual topology.

A location estimation program according to the present invention is a program for allowing a computer to estimate a location of a moving wireless node that moves in a wireless communication space. The location estimation program includes an acquisition step, a fixed node location estimation step and a moving node location estimation step. The acquisition step includes acquiring neighbor node information that is information of first vicinity nodes that are present at a distance of 1 hop from one wireless node from each of the moving wireless node and m (m is an integer that is equal or larger than 4) fixed wireless nodes that do not move in the wireless communication space. The fixed node location estimation step includes estimating locations of the m fixed wireless nodes based on neighbor node information about each of the m fixed wireless nodes. The moving node location estimation step includes estimating a location of the moving wireless node based on neighbor node information of the moving wireless node and estimated locations of the m fixed wireless nodes estimated in the fixed node location estimation step. The fixed node location estimation step includes a fixed topology production step, a first self-location production step and a first location update step. The fixed topology production step includes producing a fixed topology indicating an arrangement relationship among the m fixed wireless nodes based on the neighbor node information about each of the m fixed wireless nodes. The first self-location production step includes producing temporal self-locations of the m fixed wireless nodes. The first location update step includes estimating the locations of the m fixed wireless nodes by updating the temporal self-locations of the m fixed wireless nodes based on the fixed topology. The moving node location estimation step includes a moving topology production step, a second self-location production step and a second location update step. The moving topology production step includes acquiring neighbor node information, of the neighbor fixed node that is a fixed wireless node, which is recorded in neighbor node information of the moving wireless node out of the m fixed wireless nodes, and producing a topology of the moving wireless node based on the neighbor node information of the moving wireless node and the neighbor node information of the neighbor fixed node. The second self-location production step includes producing a temporal self-location of the moving wireless node. The second location update step includes estimating a location of the moving node by updating the temporal self-location of the moving wireless node based on the moving topology and an estimated location of the neighbor fixed node.

Advantageous Effects of Invention

The location estimation device according to the present invention produces a fixed topology based on neighbor node information of m wireless nodes, and estimates the locations of the m wireless nodes by updating temporal self-locations of the m wireless nodes based on the fixed topology. This location estimation device sets the virtual wireless communication distance between two wireless nodes that are present at a distance of 1 hop from each other, re-sets first vicinity nodes located at a distance of 1 hop from the one wireless node based on the virtual wireless communication distance and produces at least one or more virtual topologies based on the re-set first vicinity nodes. This location estimation device estimates the locations of the m wireless nodes based on the at least one virtual topology. The region determination value indicating a frequency of occurrence of a topology conflict in the estimated locations of the m wireless nodes is calculated for each of the fixed topology and at least one virtual topology. This location estimation device specifies the lowest region determination value from among the calculated region determination values, and outputs the estimated location of the topology corresponding to the specified lowest region determination value as a result of location estimation. Thus, estimated locations of the m wireless nodes with few topology conflicts can be specified, so that the locations of the m wireless nodes can be estimated with high accuracy.

Further, the location estimation device according to the present invention produces a fixed topology based on the neighbor node information of the m wireless nodes, and estimates the locations of the m fixed wireless nodes by updating temporal self-locations of the m fixed wireless nodes based on the produced fixed topology. This location estimation device produces a moving topology of moving nodes based on the neighbor node information of moving nodes and the neighbor node information of neighbor fixed nodes that is recorded in the neighbor node information of the moving nodes. This location estimation device estimates the locations of the moving nodes by updating the temporal self-locations of the moving nodes based on the moving topology and the estimated locations of neighbor fixed nodes. It is possible to estimate the locations of the moving nodes with high accuracy by estimating the locations of the moving nodes after estimating the locations of fixed nodes.

BRIEF DESCRIPTION OF THE DRAWINGS

FIG. 2 is a diagram showing one example of neighbor node information produced by wireless nodes shown in FIG. 1.

FIG. 11 is a conceptual diagram for explaining a topology conflict that occurs when a location of a fixed node shown in FIG. 1 is estimated.

FIG. 12 is a conceptual diagram for explaining the steps for determining presence or absence of a topology conflict in an estimated location of a fixed node shown in FIG. 1.

EMBODIMENTS FOR CARRYING OUT THE INVENTION

Figure 1:
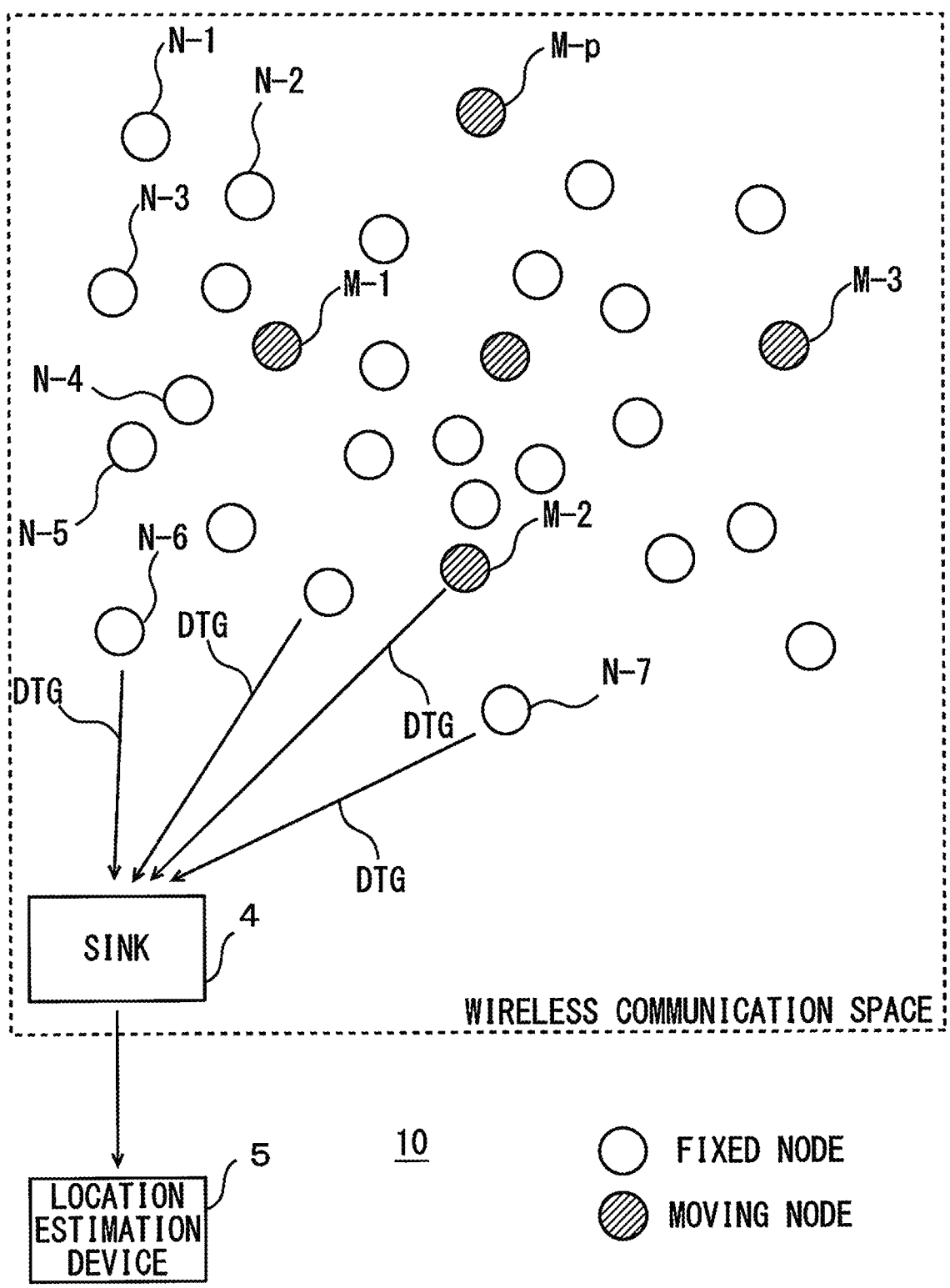
FIG. 1 is a schematic diagram showing a configuration of a wireless network according to embodiments of the present invention.

Embodiments of the present invention will be described below in detail with reference to drawings. In the drawings, the same or corresponding parts are denoted with the same reference characters. A detailed description thereof will not be repeated.

[1. Overall Configuration] [1.1. Configuration of Wireless Network] FIG. 1 is a schematic diagram showing the configuration of the wireless network 10 according to embodiments of the present invention. As shown in FIG. 1, the wireless network 10 includes fixed wireless nodes N-1, N-2, . . . , N-k, moving wireless nodes M-1, M-2, . . . , M-p, a sink 4 and a location estimation device 5. k is an integer that is equal to or larger than four, and p is an integer that is equal to or larger than 1.

In FIG. 1, reference characters corresponding to some of the fixed wireless nodes and some of the moving wireless nodes are not shown. While the transmission of notification packets DTG to the sink 4 by some of the fixed wireless nodes and some of the moving wireless nodes is shown in the diagram, other fixed wireless nodes and other moving wireless nodes also transmit notification packets DTG to the sink 4. Details of the notification packets DTG will be described below.

In the following description, a "fixed wireless node" is referred to as a "fixed node," and a "moving wireless node" is referred to as a "moving node." Further, the fixed nodes N-1 to N-k and the moving nodes M-1 to M-p are collectively termed as "wireless nodes."

The wireless nodes and the sink 4 constitute the wireless network 10 by carrying out short-range wireless communication. The wireless nodes and the sink 4 carry out wireless communication in accordance with communication standards such as BLE (Bluetooth (registered trade mark) Low Energy) and IEE 802.15.4 as the short-range wireless communication.

The fixed nodes N-1 to N-k are arranged in wireless communication spaces (for example, commercial establishments such as shopping centers and railway stations). The fixed nodes N-1 to N-k are sensing devices provided with sensors, for example. The sensors provided in the respective fixed nodes N-1 to N-k detect a temperature, humidity and so on, and transmit these detection values to the sink 4 by wireless communication.

Three fixed nodes out of the fixed nodes N-1 to N-k are anchor nodes, the absolute locations of which are designated in advance. The absolute locations are designated by latitude and longitude, for example.

The moving nodes M-1 to M-k are portable communication terminals such as smartphones, mobile phones and tablets. Further, the wireless nodes M-1 to M-k include acceleration sensors and measure acceleration as described below.

Each of the wireless nodes produces an advertisement packet including self-identification information (an address, for example) and broadcasts the produced advertisement packet. Then, when receiving an advertisement packet from another wireless node, each of the wireless nodes demodulates the received advertisement packet and detects the identification information included in the demodulated advertisement packet.

FIG. 2 is a diagram showing one example of neighbor node information 21M produced in the moving node M-1. As shown in FIG. 2, the neighbor node information 21M is the data recording self-identification information, the acceleration detected in the moving node M-1 and identification information of other wireless nodes detected from the received advertisement packets.

In the neighbor node information 21M, the identification information of the moving node M-1 is "Address M-1," and the acceleration detected in the moving node M-1 is 2.0 (m/sec$^2$). Further, the identification information detected from the advertisement packets received from other wireless nodes is recorded in the field of the neighbor nodes. Specifically, the identification information "Address N-1" of the fixed node N-1, the identification information "Address N-5" of the fixed node N-5 and the identification information "Address M-2" of the moving node M-2 are described.

The wireless nodes other than the moving node M-1 also produce neighbor node information similar to the neighbor node information 21M shown in FIG. 2. That is, all of the fixed nodes and the moving nodes produce neighbor node information. However, each of the fixed nodes does not include an acceleration sensor, so that the neighbor node information produced by each of the fixed nodes does not include acceleration.

In this manner, each of the wireless nodes produces the neighbor node information recording at least the self-identification information and identification information of other wireless nodes detected from the received advertisement packets. Each of the wireless nodes produces a notification packet DTG including the produced neighbor node information and transmits the notification packet DTG to the sink 4. The neighbor node information includes the identification information detected from an advertisement packet directly received by each of the wireless nodes from other wireless nodes. That is, the neighbor node information includes information of wireless nodes that are located at a distance of 1 hop from a wireless node. One hop indicates the communication between two wireless nodes with no other wireless node interposed therebetween.

FIG. 1 shows the direct transmission of the notification packets DTG by some of the wireless nodes to the sink 4. However, the wireless nodes may not be able to directly transmit the notification packets DTG to the sink 4. In this case, the notification packets DTG are transmitted from the wireless nodes to the sink 4 by multi-hop. The multi-hop indicates the communication between two wireless nodes with another wireless node interposed therebetween. For example, two hops mean that the number of other wireless node that relays two wireless nodes is one. That is, when a notification packet DTG is transmitted from a wireless node to the sink 4, the communication path of the notification packet DTG is not limited in particular. The sink 4 can receive a notification packet DTG transmitted from each wireless node.

The sink 4 receives a notification packet DTG from each of the wireless nodes and detects neighbor node information from the received notification packet DIG. The sink 4 transmits the detected neighbor node information to the location estimation device 5.

The location estimation device 5 is provided on a cloud network, for example, and receives neighbor node information from the sink 4. Thus, the location estimation device 5 acquires the neighbor node information from all of the wireless nodes and estimates a location of each of the wireless nodes based on the acquired neighbor node information.

The location estimation device 5 creates a topology (hereinafter referred to as a "fixed topology") that indicates the arrangement relationship among the fixed nodes N-1 to N-k using the neighbor node information of each of the fixed nodes. Thereafter, the location estimation device 5 estimates the locations of the fixed nodes N-1 to N-k based on the created fixed topology by the below-mentioned method. After estimating the location of each of the fixed nodes, the location estimation device 5 estimates the locations of the moving nodes M-1 to M-k by the below-mentioned method. While details will be described below, the process of estimating the locations of fixed nodes is partially different from the process of estimating the locations of moving nodes.

In each of the wireless nodes, advertisement packets are broadcasted at preset time intervals. Each of the wireless nodes regularly transmits a notification packet DTG including neighbor node information. Thus, the location estimation device 5 can regularly acquire the neighbor node information from each wireless node, thereby repeatedly estimating the locations of the fixed nodes N-1 to N-k and the moving nodes M-1 to M-p. The time intervals for location estimation of the fixed nodes N-1 to N-k are set longer than the time intervals for location estimation of the moving nodes M-1 to M-k.

[1.2. Configuration of Fixed Nodes]

Figure 3:
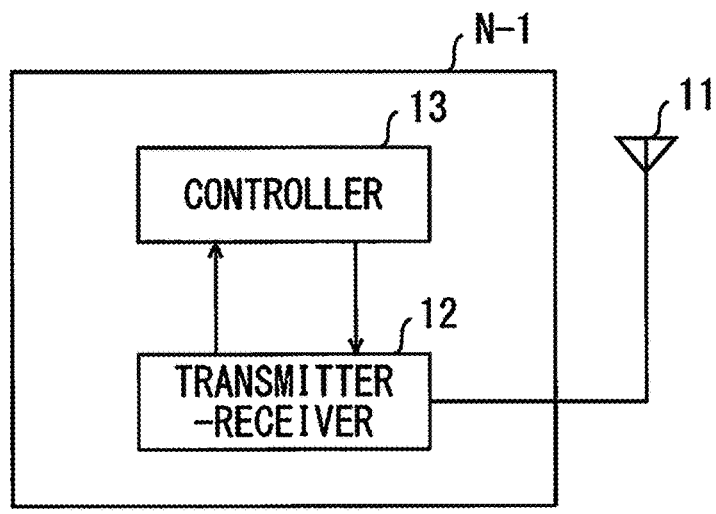
FIG. 3 is a functional block diagram showing a configuration of a fixed node shown in FIG. 1.

FIG. 3 is a functional block diagram showing the configuration of the fixed node N-1 shown in FIG. 1. As shown in FIG. 3, the fixed node N-1 includes an antenna 11, a transmitter-receiver 12 and a controller 13.

The transmitter-receiver 12 receives an advertisement packet through the antenna 11 and outputs the received advertisement packet to the controller 13. Further, when receiving the advertisement packet including the identification information of the fixed node N-1 from the controller 13, the transmitter-receiver 12 broadcasts the received advertisement packet through the antenna 11. When receiving the notification packet DTG including the neighbor node information from the controller 13, the transmitter-receiver 12 sets the destination of the received notification packet DTG to the sink 4 and transmits the notification packet DTG, the destination of which is set to the sink 4, through the antenna 11.

The controller 13 has the identification information of the fixed node N-1 in advance. The controller 13 produces an advertisement packet including the identification information of the fixed node N-1 and outputs the produced advertisement packet to the transmitter-receiver 12.

When receiving an advertisement packet from the transmitter-receiver 12, the controller 13 detects the identification information of other wireless nodes from the received advertisement packet. When the fixed node N-1 receives the advertisement packets from the fixed nodes N-2, N-4 and the moving node M-3, for example, the controller 13 detects the identification information of the fixed node N-2, the identification information of the fixed node N-4 and the identification information of the moving node M-3 from the respective received three packets. Then, the controller 13 produces the neighbor node information that links the identification information of the fixed node N-2, the identification information of the fixed node N-4 and the identification information of the moving node M-3 to the self(the fixed node N-1)-identification information. The controller 13 produces the notification packet DTG including the produced neighbor node information and outputs the notification packet DTG to the transmitter-receiver 12.

The configuration of each of the fixed nodes N-2 to N-k shown in FIG. 1 is the same as that of the fixed node N-1 shown in FIG. 3.

[1.3. Configuration of Moving Nodes]

Figure 4:
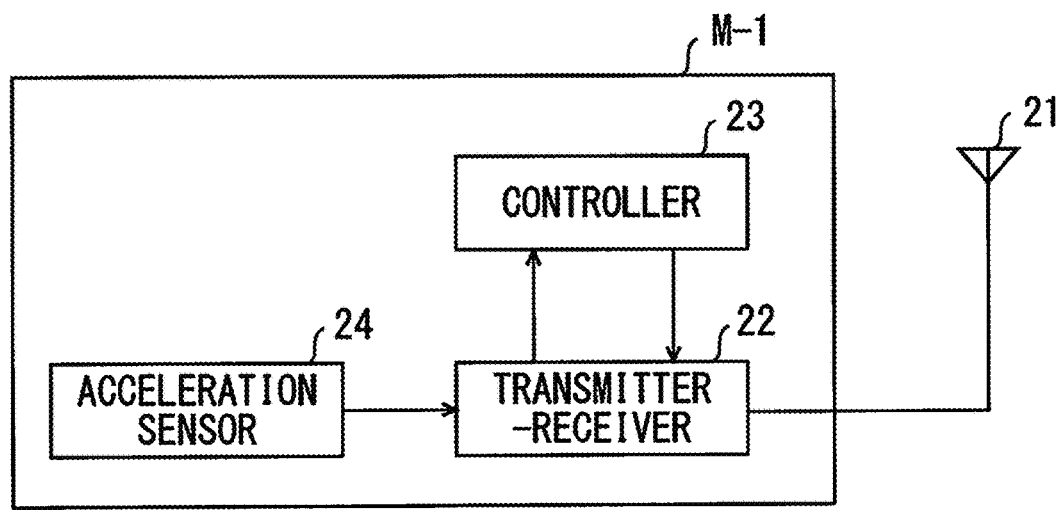
FIG. 4 is a functional block diagram showing a configuration of a moving node shown in FIG. 1.

FIG. 4 is a functional block diagram showing the configuration of the moving node M-1 shown in FIG. 1. As shown in FIG. 4, the moving node M-1 includes an antenna 21, a transmitter-receiver 22, a controller 23 and an acceleration sensor 24.

The transmitter-receiver 22 receives an advertisement packet through the antenna 21 and outputs the received advertisement packet to the controller 23. Further, when receiving the advertisement packet including the identification information of the moving node M-1 from the controller 23, the transmitter-receiver 22 broadcasts the received advertisement packet through the antenna 21. When receiving the notification packet DTG including the neighbor node information 21M from the controller 23, the transmitter-receiver 22 transmits the received notification packet DTG to the sink 4 through the antenna 11.

The controller 23 has the identification information of the moving node M-1 in advance. The controller 23 produces the advertisement packet including the identification information of the moving node M-1 and outputs the produced advertisement packet to the transmitter-receiver 22.

When receiving an advertisement packet from the transmitter-receiver 22, the controller 23 detects the identification information of other wireless nodes from the received advertisement packet. When receiving advertisements packet from the fixed node N-1, the fixed node N-5 and the moving node M-2, the controller 23 respectively acquires the identification information of the fixed node N-1, the identification information of the fixed node N-5 and the identification information of the moving node M-2 from the three received packets. Further, the controller 23 acquires the acceleration detected by the acceleration sensor 24. The controller 23 produces the neighbor node information 21M shown in FIG. 2 using the identification information of the fixed node N-1, the identification information of the fixed node N-5, the identification information of the moving node M-2 and the acceleration acquired from the acceleration sensor 24. The controller 23 produces the notification packet DTG including the produced neighbor node information and outputs the notification packet DTG to the transmitter-receiver 22.

[1.4. Configuration of Sink 4]

Figure 5:
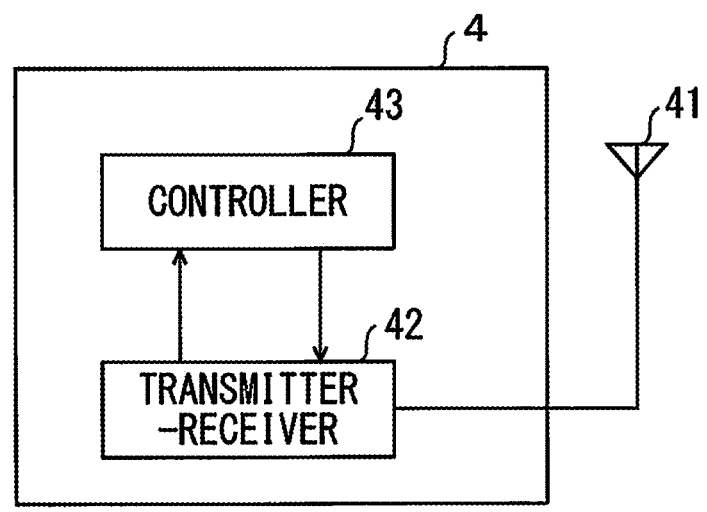
FIG. 5 is a functional block diagram showing a configuration of a sink shown in FIG. 1.

FIG. 5 is a functional block diagram showing the configuration of the sink 4 shown in FIG. 1. As shown in FIG. 5, the sink 4 includes an antenna 41, a transmitter-receiver 42 and a controller 43.

The transmitter-receiver 42 receives a notification packet DTG through the antenna 41 and outputs the received notification packet DTG to the controller 43. Further, when receiving the neighbor node information from the controller 43, the transmitter-receiver 42 transmits the received neighbor node information to the location estimation device 5 through the antenna 41 and the Internet (not shown).

When receiving the notification packet DTG from the transmitter-receiver 42, the controller 43 detects the neighbor node information from the received notification packet DTG and outputs the detected neighbor node information to the transmitter-receiver 42.

[1.5. Configuration of Location Estimation Device 5]

Figure 6:
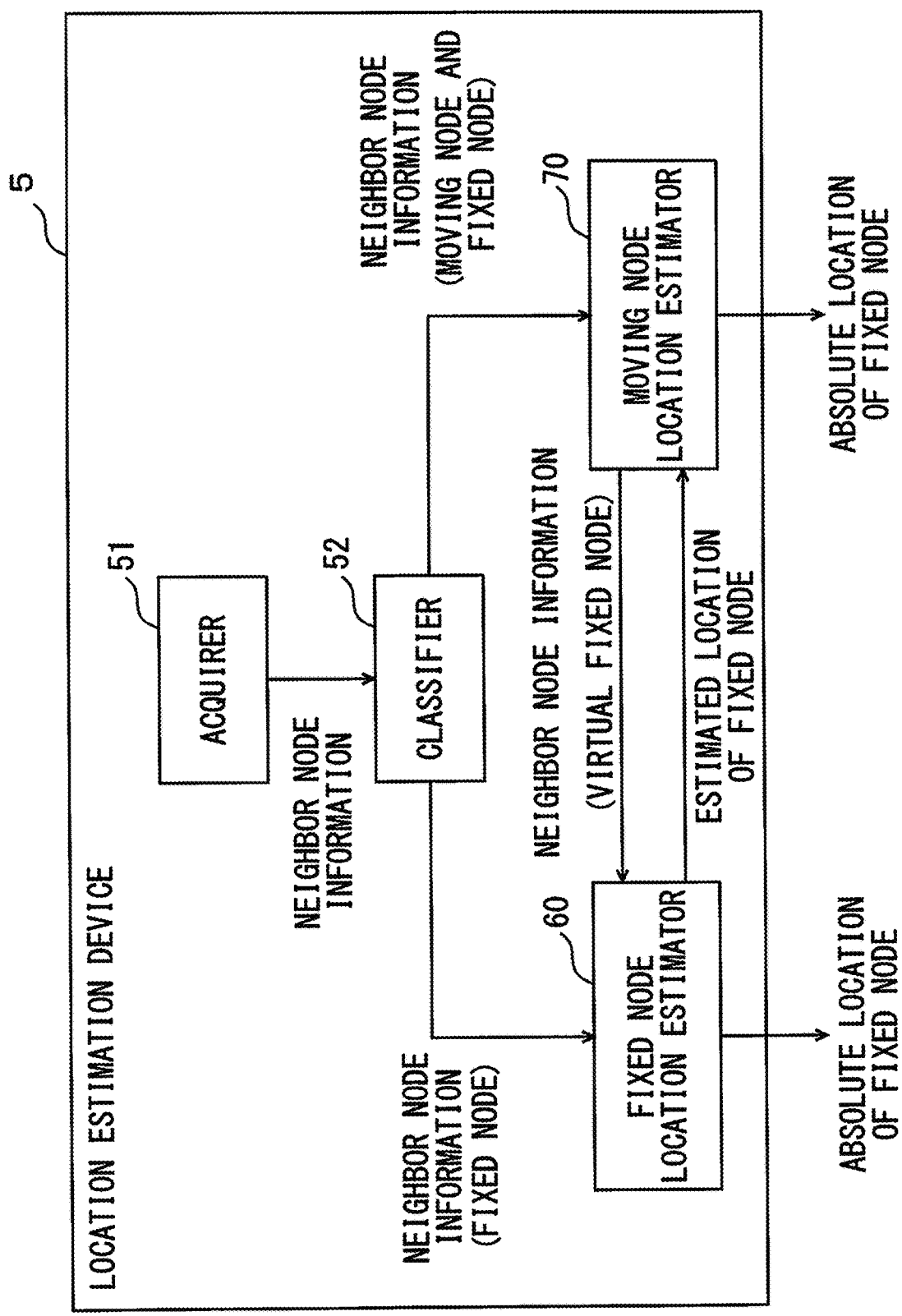
FIG. 6 is a functional block diagram showing a configuration of a location estimation device shown in FIG. 1.

FIG. 6 is a functional block diagram showing the configuration of the location estimation device 5 shown in FIG. 1. As shown in FIG. 6, the location estimation device 5 includes an acquirer 51, a classifier 52, a fixed node location estimator 60 and a moving node location estimator 70.

The acquirer 51 acquires the neighbor node information of each wireless node by receiving the neighbor node information of each wireless node from the sink 4 through the Internet. The acquirer 51 outputs the received neighbor node information to the classifier 52.

The classifier 52 receives the neighbor node information of each wireless node from the acquirer 51. The classifier 52 classifies the received neighbor node information into the neighbor node information of the fixed nodes N-1 to N-k and the neighbor node information of the moving nodes M-1 to M-p. The classifier 52 outputs the neighbor node information of the fixed nodes N-1 to N-k to the fixed node location estimator 60. Further, the classifier 52 outputs the neighbor node information of the moving nodes M-1 to M-p and the neighbor node information of the fixed nodes satisfying a predetermined condition out of the fixed nodes N-1 to N-k to the moving node location estimator 70.

The fixed node location estimator 60 receives the neighbor node information of the fixed nodes N-1 to N-k from the classifier 52 and produces the fixed topology indicating the arrangement relationship among the fixed nodes N-1 to N-k based on the received neighbor node information. The fixed node location estimator 60 estimates the locations of the fixed nodes N-1 to N-k based on the produced fixed topology and acquires the estimated locations of the fixed nodes N-1 to N-k. The fixed node location estimator 60 converts the estimated locations of the acquired fixed nodes N-1 to N-k into absolute locations.

Further, after the neighbor node information of the moving node M-u (u is an integer that is equal to or larger than 1 and equal to or smaller than p) is used for estimating the location of the moving node M-u, the fixed node location estimator 60 acquires the neighbor node information of the moving node M-u as the neighbor node information of a virtual fixed node from the moving node location estimator 70.

When re-estimating the locations of the fixed nodes N-1 to N-k, the fixed node location estimator 60 uses the neighbor node information of the moving node M-u acquired from the moving node location estimator 70 as the neighbor node information of a virtual fixed node.

The moving node location estimator 70 receives the neighbor node information of the moving nodes M-1 to M-p from the classifier 52 and receives the estimated locations of some of the fixed nodes N-1 to N-k from the fixed node location estimator 60. The moving node location estimator 70 acquires the estimated locations of the moving nodes M-1 to M-p based on the received neighbor node information and the received estimated locations of the fixed nodes. The moving node location estimator 70 converts the estimated locations of the moving nodes M-1 to M-p into absolute locations. Further, the moving node location estimator 70 estimates the location of the moving node M-u and then outputs the neighbor node information of the moving node M-u used for location estimation to the fixed node location estimator 60.

[1.6. Configuration of Fixed Node Location Estimator 60]

Figure 7:
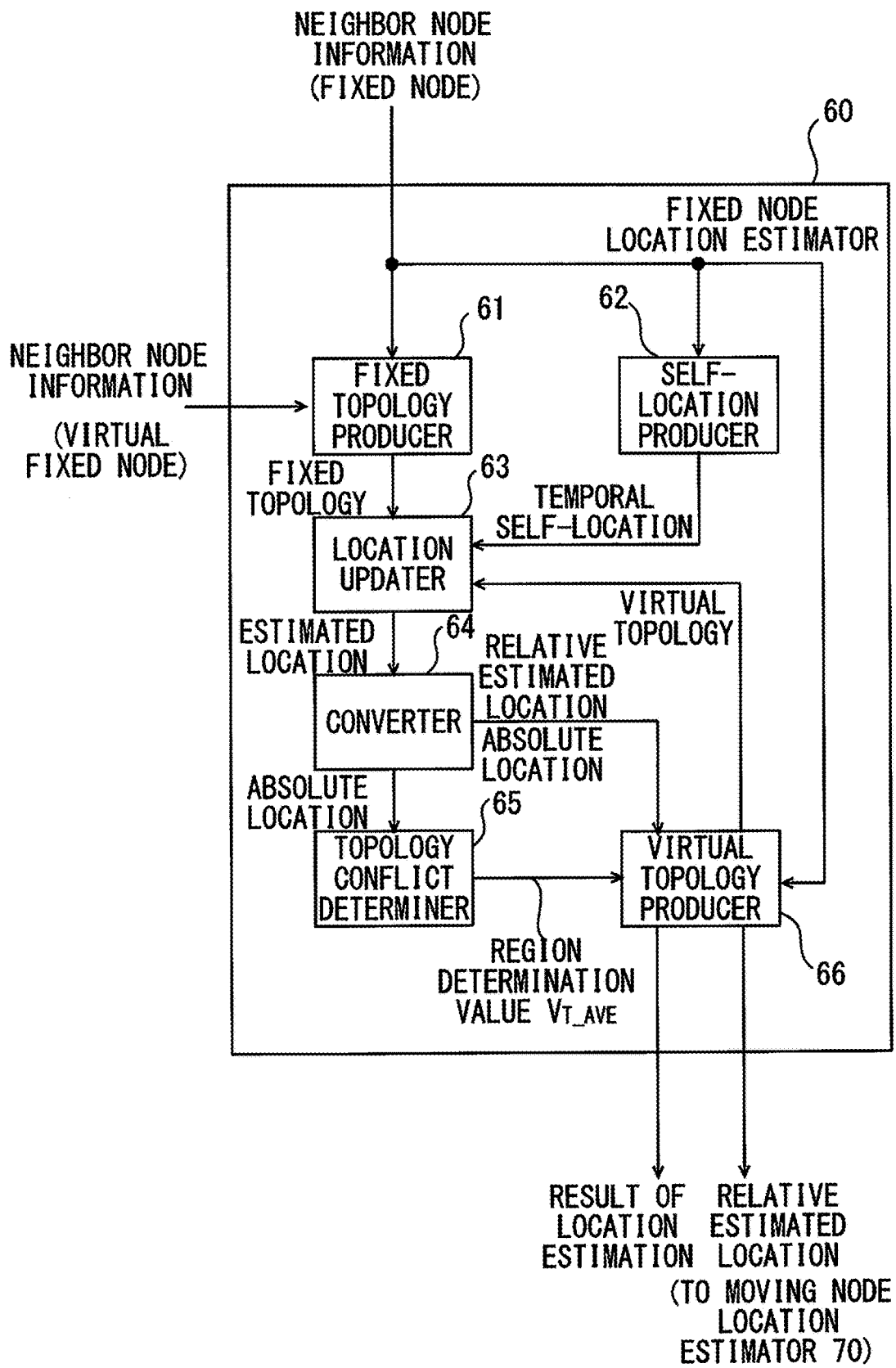
FIG. 7 is a functional block diagram showing a configuration of a fixed node location estimator shown in FIG. 6.

FIG. 7 is a functional block diagram showing the configuration of the fixed node location estimator 60 shown in FIG. 6. As shown in FIG. 7, the fixed node location estimator 60 includes a fixed topology producer 61, a self-location producer 62, a location updater 63, a converter 64, a topology conflict determiner 65 and a virtual topology producer 66.

The fixed topology producer 61 receives the neighbor node information of the fixed nodes N-1 to N-k from the classifier 52 and produces a fixed topology based on the received neighbor node information. The fixed topology indicates the arrangement relationship among the fixed nodes N-1 to N-k and is produced for each of the fixed nodes N-1 to N-k. The fixed topology producer 61 outputs the produced topology to the location updater 63.

Further, when receiving the neighbor node information of a moving node from the moving node location estimator 70, the fixed topology producer 61 uses the received neighbor node information of the moving node for production of a fixed topology as the neighbor node information of a virtual fixed node.

In the following description, the neighbor node information of the fixed nodes N-1 to N-k is used, and the neighbor node information of a virtual fixed node is not used, by way of example.

The self-location producer 62 receives the neighbor node information of the fixed nodes N-1 to N-k from the classifier 52 and identifies the fixed nodes N-1 to N-k that constitute the wireless network 10 based on the received neighbor node information. The self-location producer 62 randomly produces temporal self-locations of the identified fixed nodes N-1 to N-k.

The location updater 63 receives the fixed topology from the fixed topology producer 61 and receives temporal self-locations of the fixed nodes N-1 to N-k from the self-location producer 62. The location updater 63 updates the temporal self-locations of the fixed nodes N-1 to N-k by the below-mentioned method based on the received fixed topology and the received temporal self-locations, thereby acquiring relative estimated locations of the fixed nodes N-1 to N-k.

The location updater 63 outputs the relative estimated locations of the fixed nodes N-1 to N-k to the converter 64 and then receives a virtual topology and virtual neighbor node information from the virtual topology producer 66. Details of the virtual topology and the virtual neighbor node information will be described below. The location updater 63 re-acquires the relative estimated locations of the fixed nodes N-1 to N-k by the below-mentioned method using the received virtual topology and the received virtual neighbor node information.

The converter 64 has the absolute locations of the anchor nodes in advance. The converter 64 receives the relative estimated locations of the fixed nodes N-1 to N-k from the location updater 63. The converter 64 converts the relative estimated locations of the fixed nodes N-1 to N-k into absolute locations by the below-mentioned method based on the received relative estimated locations and the absolute locations of the anchor nodes. The converter 64 outputs the converted absolute locations of the fixed nodes N-1 to N-k to the topology conflict determiner 65 and the virtual topology producer 66.

The topology conflict determiner 65 receives the absolute locations of the fixed nodes N-1 to N-k from the converter 64, determines presence or absence of a topology conflict in each fixed node based on the received absolute locations of the fixed nodes N-1 to N-k and calculates a region determination value $V_{T\_AVE}$ indicating the frequency of occurrence of a topology conflict. Further, the topology conflict determiner 65 calculates a region determination value $V_{T\_AVE}$ corresponding to a virtual topology based on the absolute locations of the fixed nodes N-1 to N-k that is acquired based on the below-mentioned virtual topology. That is, the region determination value $V_{T\_AVE}$ is calculated for each topology. The method of determining presence and absence of a topology conflict and the method of calculating a region determination value $V_{T\_AVE}$ will be described below.

The virtual topology producer 66 receives a region determination value $V_{T\_AVE}$ from the topology conflict determiner 65 and acquires a relative estimated location and an absolute location corresponding to the received region determination value $V_{T\_AVE}$ from the converter 64.

The virtual topology producer 66 virtually changes the wireless communication distances of the fixed nodes N-1 to N-k based on the received region determination value $V_{T\_AVE}$. The virtual topology producer 66 determines virtual first vicinity nodes for each of the fixed nodes N-1 to N-k based on the changed virtual wireless communication distances and the absolute locations of the fixed nodes N-1 to N-k. The virtual neighbor node information is produced for each of the fixed nodes N-1 to N-k and indicates a virtual first vicinity node of each of the fixed nodes N-1 to N-k. The virtual topology producer 66 produces a virtual topology of each of the fixed nodes N-1 to N-k by the below-mentioned method based on the produced virtual neighbor node information. At least one virtual topology is produced. The virtual topology producer 66 outputs the produced virtual topology to the location updater 63.

The virtual topology producer 66 compares the region determination value $V_{T\_AVE}$ corresponding to the fixed topology with the region determination value $V_{T\_AVE}$ corresponding to each of at least one virtual topology. Based on the result of comparison, the virtual topology producer 66 outputs one of the absolute location of the fixed node that is acquired based on the fixed topology and the absolute location of the fixed node that is acquired based on each of the at least one virtual topology as a result of location estimation of the fixed node. Further, the virtual topology producer 66 outputs the relative estimated location of the fixed node corresponding to the absolute location of the fixed node that is output as a result of location estimation to the moving node location estimator 70.

[1.7. Configuration of Moving Node Location Estimator 70]

Figure 8:
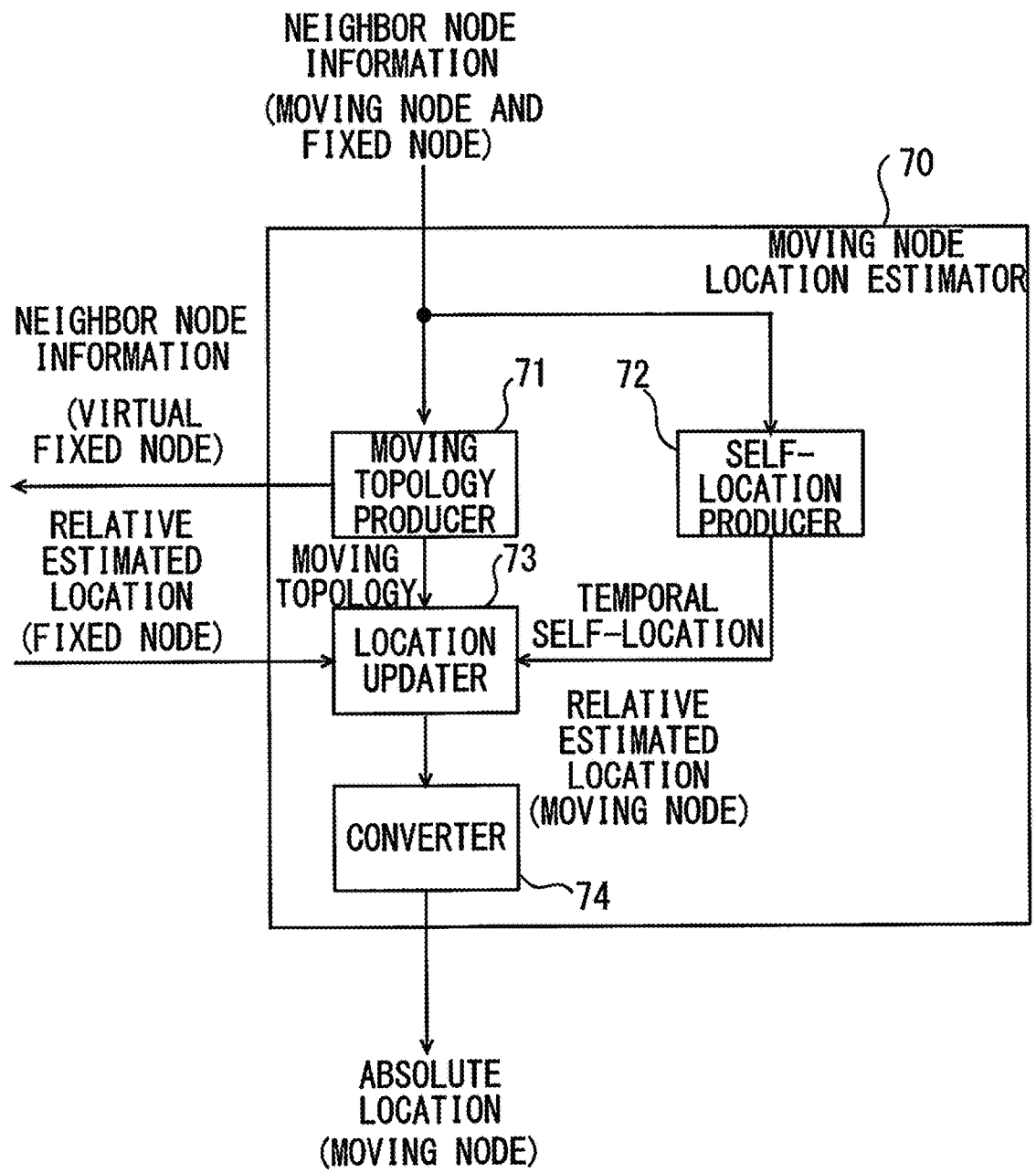
FIG. 8 is a functional block diagram showing a configuration of a moving node location estimator shown in FIG. 6.

FIG. 8 is a functional block diagram showing the configuration of the moving node location estimator 70 shown in FIG. 6. As shown in FIG. 8, the moving node location estimator 70 includes a moving topology producer 71, a self-location producer 72, a location updater 73 and a converter 74.

The moving topology producer 71 acquires the neighbor node information of the moving nodes M-1 to M-p and selects a moving node M-u (u is an integer that is equal to or larger than 1 and equal to or smaller than p), the location of which is to be estimated, from among the moving nodes M-1 to M-p. The moving topology producer 71 specifies a fixed node recorded in the neighbor node information of the moving node M-u and acquires the neighbor node information of the specified fixed node from the classifier 52. The moving topology producer 71 produces the topology of the moving node M-u (the moving topology) based on the neighbor node information of the moving node M-u and the neighbor node information of the specified fixed node.

Further, the moving topology producer 71 outputs the neighbor node information of the moving node M-u to the fixed node location estimator 60 after the location estimation of the moving node M-u. The neighbor node information of this moving node M-u is used as the neighbor node information of the virtual fixed node.

The self-location producer 72 randomly produces the temporal self-location of the moving node M-u.

The location updater 73 receives the moving topology of the moving node M-u from the moving topology producer 71 and receives the temporal self-location of the moving node M-u from the self-location producer 72. The location updater 73 acquires the relative estimated location of the moving node M-u by updating the temporal self-location of the moving node M-u using the below-mentioned method based on the received moving topology and the received temporal self-location.

The converter 74 has the absolute locations of the anchor nodes in advance. The converter 74 receives the relative estimated location of the moving node M-u from the location updater 73. Similarly to the converter 64 (see FIG. 7), the converter 74 converts the relative estimated location of the moving node M-u into the absolute location by the below-mentioned method based on the received relative estimated location of the moving node M-u and the absolute locations of the anchor nodes. The converter 74 outputs the absolute location of the moving node M-u, which is formed as a result of conversion, as the result of location estimation of the moving node M-u.

[2. Outline of Operation of Location Estimation Device 5]

Figure 9:
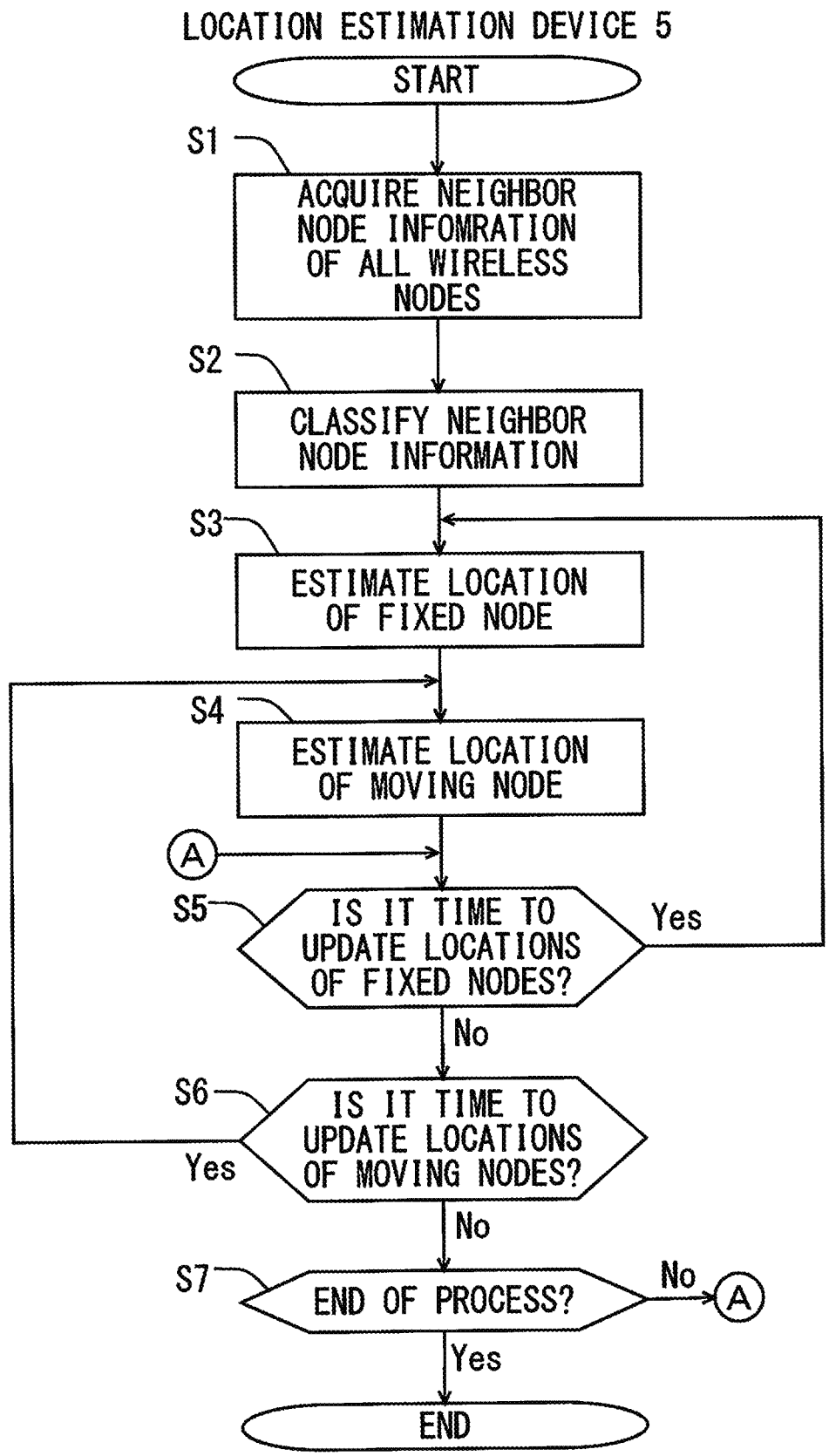
FIG. 9 is a flow chart showing an operation of the location estimation device shown in FIG. 1.

FIG. 9 is a flow chart showing the basic operation of the location estimation device 5. When the location estimation of a wireless node is started, the acquirer 51 receives the neighbor node information of each of wireless nodes from the sink 4. The classifier 52 acquires the neighbor node information of all of the wireless nodes from the acquirer 51 (step S1).

The classifier 52 classifies the acquired neighbor node information into the neighbor node information of fixed nodes and the neighbor node information of moving nodes (step S2). For example, when the neighbor node information to be classified does not include acceleration, the classifier 52 classifies the neighbor node information as the neighbor node information of the fixed nodes. When the neighbor node information to be classified includes acceleration, the classifier 52 classifies the neighbor node information as the neighbor node information of the moving nodes.

The classification conditions of the neighbor node information are not limited to the above. For example, when the identification information of the fixed nodes and the identification information of the moving nodes are set in advance in the classifier 52, the classifier 52 may classify the neighbor node information based on the self-identification information included in the neighbor node information.

Further, the classifier 52 may classify the neighbor node information including the acceleration that is higher than a preset threshold value as the neighbor node information of a moving node, and the neighbor node information including the acceleration that is equal to or lower than the threshold value as the neighbor node information of a fixed node. In this case, some of the moving nodes M-1 to M-k may be treated as fixed nodes.

The present embodiment will be explained assuming that the wireless node does not change from a fixed node to a moving node, or does not change from a moving node to a fixed node, for the sake of explanation. While the neighbor node information of a moving node may be treated as the neighbor node information of a virtual fixed node afterwards, this will be explained separately.

The fixed node location estimator 60 estimates the locations of the fixed nodes N-1 to N-k based on the neighbor node information of the fixed nodes N-1 to N-k that is received from the classifier 52 and acquires relative estimated values (step S3). The fixed node location estimator 60 converts the relative estimated locations of the fixed nodes N-1 to N-k into the absolute locations.

The moving node location estimator 70 receives the neighbor node information of the moving nodes from the classifier 52 and receives the relative estimated locations of the fixed nodes N-1 to N-k from the fixed node location estimator 60. The moving node location estimator 70 estimates the locations of the moving nodes M-1 to M-p based on the neighbor node information of the moving nodes and the relative estimated locations of the fixed nodes N-1 to N-k (step S4).

In the step S4, when estimating the location of the moving node M-u (u is an integer that is equal to or larger than 1 and equal to or smaller than p), the moving node location estimator 70 uses the neighbor node information of the first vicinity fixed nodes of the moving node M-u out of the neighbor node information of the fixed nodes N-1 to N-k. The neighbor node information of a fixed node that is not a first vicinity fixed node of the moving node M-u is not used for the location estimation of the moving node M-u. That is, when estimating the location of the moving node M-u, the moving node location estimator 70 uses the information relating to the fixed nodes that are at a distance of 2 hops or less from the moving node M-u. Therefore, the location of the moving node M-u is estimated within a topical range as compared to the location estimation of the fixed nodes N-1 to N-k.

Each wireless node transmits a notification packet DTG including the neighbor node information regularly. When acquiring new neighbor node information from the acquirer 51, the classifier 52 updates the neighbor node information used for the location estimation of the wireless node. Therefore, the location estimation device 5 updates the estimated locations of the fixed nodes and the estimated locations of the moving nodes regularly by repeating the steps S3 to S7.

Specifically, the location estimation device 5 makes a judgement whether it is the time to update the locations of the fixed nodes (step S5) after the location estimation of the moving nodes (step S4). The locations of the fixed nodes are set to be updated every 20 seconds, for example. When it is the time to update the locations of the fixed nodes (Yes in the step S5), the fixed node location estimator 60 re-estimates the locations of the fixed nodes based on the neighbor node information updated by the classifier 52 (step S3).

When it is not the time to update the locations of the fixed nodes (No in the step S5), the location estimation device 5 makes a judgement whether it is the time to update the locations of the moving nodes (step S6). The locations of the moving nodes are set to be updated every 5 seconds, for example. That is, the frequency of update of the estimated locations of the moving nodes is higher than the frequency of update of the estimated locations of the fixed nodes. This is because the estimated locations of the moving nodes are required to follow the actual movement of the moving nodes in real time.

When it is the time to update the locations of the moving nodes (Yes in the step S6), the moving node location estimator 70 re-estimates the locations of the moving nodes based on the neighbor node information updated by the classifier 52 (step S4).

When it is not the time to update the locations of the moving nodes (No in the step S6), the location estimation device 5 makes a judgement whether to end the location estimation process (step S7). When it is determined that the location estimation process is to continue (No in the step S7), the location estimation device 5 returns to the process of the step S5. On the other hand, when it is determined that the location estimation process is to end (Yes in the step S7), the location estimation device 5 ends the process shown in FIG. 9.

[3. Process of Estimating Location of Fixed Nodes (Step S3)]

Figure 10:
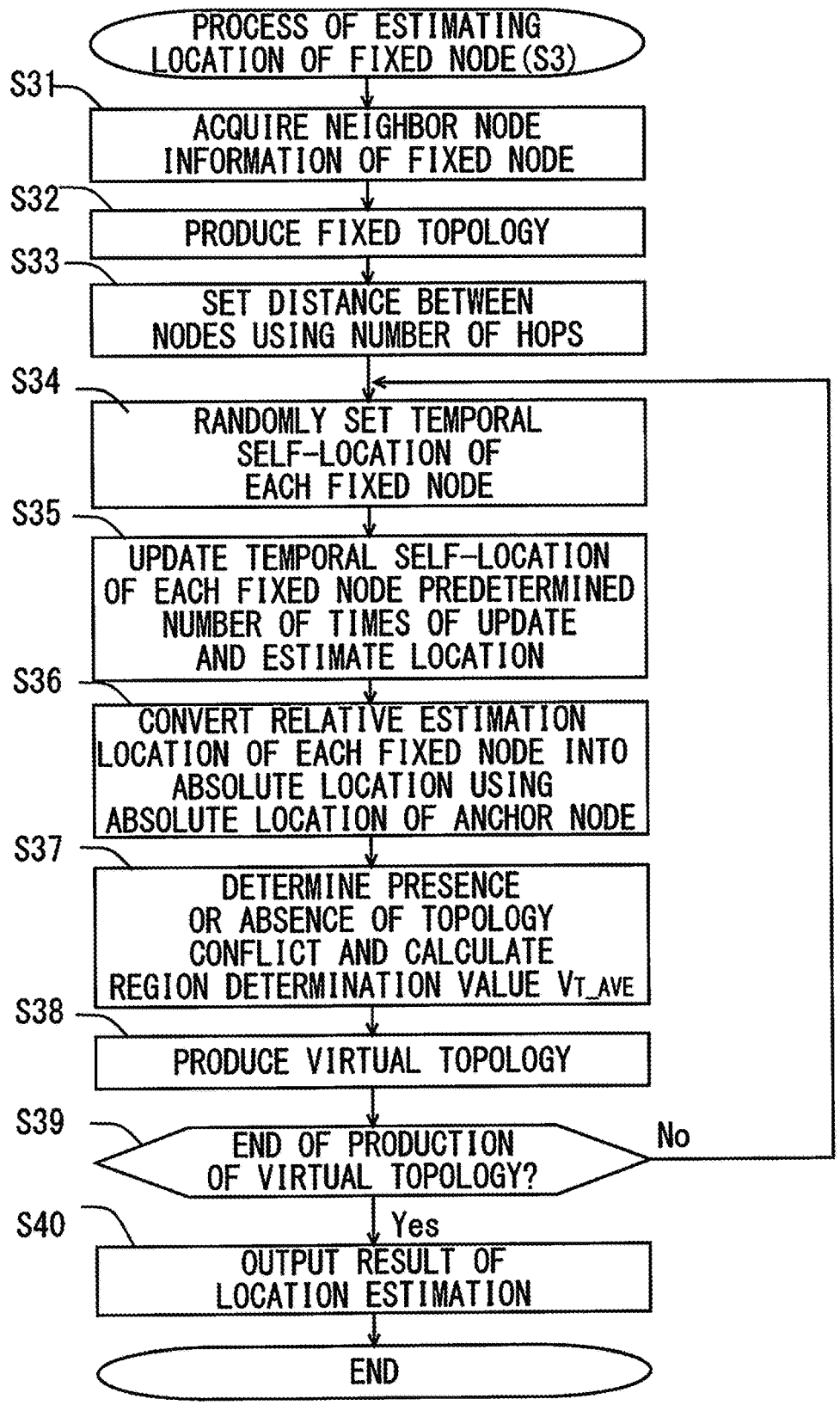
FIG. 10 is a flow chart showing an operation of the fixed node location estimator shown in FIG. 6.

FIG. 10 is a flowchart showing the operation of the fixed node location estimator 60. Details of the process of estimating the locations of the fixed nodes N-1 to N-k (step S3) will be described below with reference to FIG. 10.

[3.1. Production of Topology]

The fixed node location estimator 60 acquires the neighbor node information of the fixed nodes N-1 to N-k from the classifier 52 (step S31).

The fixed topology producer 61 produces the fixed topology corresponding to each fixed node (step S32) based on the neighbor node information acquired in the step S31 and outputs the produced fixed topology to the location updater 63.

Specifically, the fixed topology producer 61 performs the process of the below-mentioned (1) to (3) and produces a fixed topology corresponding to each fixed node. In the following description, 'i' is an integer that is equal to or larger than 1 and equal to or smaller than k.

(1) The fixed node included in the neighbor node information of the fixed node N-i is a first vicinity node N-j (j satisfies i≠j and is an integer that is equal to or larger than 1 and equal to or smaller than k) of the fixed node N-i.

(2) The fixed node included in the neighbor node information of the first vicinity node N-j and not included in the neighbor node information of the fixed node N-i is a second vicinity node of the fixed node N-i with the fixed node N-j taken as a relay node.

(3) Similarly, the fixed node, which is included in the neighbor node information of the n-th vicinity node and not included in the neighbor node information of a vicinity node group including vicinity nodes of up to the (n−1)th, is an (n+1)th vicinity node of the fixed node N-i with the n-th vicinity node taken as a relay node. Here, n is desirably 3 or more.

(4) The above-mentioned (1) to (3) are repeated recursively, so that multiple vicinity nodes of the fixed node N-i in the wireless network 10 are set. The multiple vicinity nodes of the fixed node N-i that are set in this manner correspond to the fixed topology of the fixed node N-i.

The fixed topology producer 61 performs the above-mentioned (1) to (4) on each of the fixed nodes N-1 to N-k and produces a fixed topology for each of the fixed nodes N-1 to N-k.

[3.2. Setting of Communication Distance (step S33)]

The location updater 63 sets the distance between fixed nodes using the number of hops with reference to the fixed topology of each fixed node (step S33).

Details of the step S33 will be described below. As described in the production of the fixed topology, the fixed topology corresponding to the fixed node N-i is the information indicating the n-th vicinity node of the fixed node N-i. The fixed topology is configured based on the number of hops the multiple vicinity nodes are at a distance of from the fixed node N-i. Therefore, letting the distance between fixed nodes that are at a distance of 1 hop from each other be a certain distance d, the location updater 63 sets the distance from the fixed node N-i to the n-th vicinity node by multiplying the certain distance d by the number of hops n ((the certain distance d)×(the number of hops n)=nd).

[3.3. Location Estimation of Fixed Nodes (step S34 to S36)]

Next, the fixed node location estimator 60 estimates an absolute location of each fixed node for the first time by performing the steps S34 to S36. In the first estimation, the fixed topology produced in the step S2 is used. In the second and subsequent estimation, the virtual topology produced in the step S38 is used. Either when the fixed topology is used or when the virtual topology is used, the process of estimating the location of each fixed node is the same.

Here, details of the location estimation based on the fixed topology produced in the step S32 will be described.

(Setting of Temporal Self-Location)

The self-location producer 62 identifies the fixed nodes N-1 to N-k that constitute the wireless network 10 based on the neighbor node information acquired in the step S31. The self-location producer 62 randomly produces the temporal self-locations $w_i(t)$ of the identified fixed nodes N-1 to N-k (step S34). The temporal self-locations are set on a predetermined two-dimensional coordinates. In a temporal self-location $w_i(t)$, i is an integer that is equal to or larger than 1 and equal to or smaller than k, and indicates one of the fixed nodes N-1 to N-k. t indicates the number of times the temporal self-location is updated.

(Update of Temporal Self-Location)

The location updater 63 acquires the temporal self-location $w_i(t)$ of the fixed node N-i produced by the self-location producer 62 and updates the acquired temporal self-location a predetermined number of times (step S35). The temporal self-location is determined as the relative estimated location of the fixed node N-i after being updated the predetermined number of times.

Specifically, the temporal self-location $w_i(t)$ of the fixed node N-i is corrected such that the distance $|w_i(t)-w_n(t)|$ that is calculated using the temporal self-location $w_i(t)$ of the fixed node N-i and the temporal self-location $w_n(t)$ of the n-th vicinity node is close to a distance nd that is formed of the number of hops from the fixed node N-i to the n-th vicinity node.

A n-th correction vector that is used when the temporal self-location $w_i(t)$ of the fixed node N-i is corrected using the temporal self-location $w_n(t)$ of the n-th vicinity node is obtained by the formula (1).

[Formula 1]

$$V_i^{[n]}(t) = \frac{na - |w_i(t) - w_n(t)|}{|w_i(t) - w_n(t)|}(w_i(t) - w_n(t)) \quad (1)$$

Further, in an initial stage of the update of the temporal self-location, the location updater 63 uses vicinity nodes in a large area. Then, the location updater 63 reduces the number of hops the vicinity nodes used for update are at a distance of from the fixed node N-i as the update of the temporal self-locations proceeds, and converges the update using the topical and detailed topology.

Therefore, the temporal self-location $w_i(t)$ of the fixed node N-i is updated according to the following formula (2).

[Formula 2]

$$w_i(t+1) = \begin{cases} w_i(t) + a_i(t) \cdot (V_i^{\{1\}}(t) + V_i^{\{n\}}(t)) \\ \quad (t < \tau_n) \\ w_i(t) + a_i(t) \cdot (V_i^{\{1\}}(t) + V_i^{\{n-1\}}(t)) \\ \quad (\tau_n \leq t < \tau_{n-1}) \\ \quad \vdots \\ w_i(t) + a_i(t) \cdot (V_i^{\{1\}}(t) + V_i^{\{3\}}(t)) \\ \quad (\tau_4 \leq t < \tau_3) \\ w_i(t) + a_i(t) \cdot (V_i^{\{1\}}(t) + V_i^{\{2\}}(t)) \\ \quad \text{(otherwise)} \end{cases} \quad (2)$$

In the formula (2), $\tau_n$ indicates the threshold value for the end of update when the number of hops is n. $\tau_{n-1}$ indicates the threshold value for the start of update when the number of hops is n. Further, in the formula (2), $\alpha_i(t)$ is a learning function of the fixed node N-i in the t-th correction and determined by the following formula (3).

[Formula 3]

$$\alpha_i(t) = \eta \alpha_i(t-1) (0 < \eta < 1) \quad (3)$$

In the formula (3), $\eta$ is a positive attenuation coefficient. Further, an initial value $\alpha_i(0)$ of the learning function $\alpha_i(t)$ is 1.

The number of times the temporal self-location $w_i(t)$ is updated is the same as long as the number of hops is between 3 and the maximum number. When the number of hops is 2, the number of times the temporal self-location $w_i(t)$ is updated is twice of the case where the numbers of hops is other than 2 since the position is estimated topically. The threshold values of the start of update and the end of update are set in a descending order from the case where the number of hops is maximum.

Then, the location updater 63 sequentially applies correction vectors from the correction vector at the top and on the right side of the formula (2) to the correction vector at the bottom and on the right side of the formula (2), thereby updating the temporal self-location $w_i(t)$ of the fixed node N-i.

The correction vector $(V_i^{\{1\}}(t) + V_i^{\{n\}}(t))$ that is at the top and on the right side of the formula (2) is the sum of the first correction vector and the n-th correction vector. The correction vector $(V_i^{\{1\}}(t) + V_i^{\{n-1\}}(t))$ that is the second from the top and on the right side of the formula (2) is the sum of the first correction vector and the (n−1)th correction vector. Similarly, the correction vector $(V_i^{\{1\}}(t) + V_i^{\{3\}}(t))$ that is the second from the bottom and on the right side of the formula (2) is the sum of the first correction vector and the third correction vector. The correction vector $(V_i^{\{1\}}(t) + V_i^{\{2\}}=(t))$ that is at the bottom and on the right side of the formula (2) is the sum of the first correction vector and the second correction vector.

Therefore, the location updater 63 updates the temporal self-location $w_i(t)$ of the fixed node N-i using the first vicinity node and the n-th vicinity node of the fixed node N-i, and then updates the temporal self-location $w_i(t)$ of the fixed node N-i using the first vicinity node and the (n−1)th vicinity node of the fixed node N-i. Similarly, the location updater 63 updates the temporal self-location $w_i(t)$ of the fixed node N-i using the first vicinity node and the third vicinity node of the fixed node N-i, and finally updates the temporal self-location $w_i(t)$ of the fixed node N-i using the first vicinity node and the second vicinity node of the fixed node N-i.

Thus, the temporal self-location $w_i(t)$ of the fixed node N-i can be updated in from broad range to topical range, and the temporal self-location $w_i(t)$ of the fixed node N-i can converge to a certain location.

For example, in the case where the temporal self-location $w_i(t)$ of the fixed node N-i is updated using correction vectors of up to the tenth correction vector (n=10), when the number of times the temporal self-location $w_i(t)$ is updated using the correction vectors $(V_i^{\{1\}}(t)\ V_i^{\{10\}}(t))$, $(V_i^{\{1\}}(t) + V_i^{\{9\}}(t))$, ..., $(V_i^{\{1\}}(t) + V_i^{\{3\}}(t))$ is one, the number of times the temporal self-location $w_i(t)$ is updated using the correction vector $(V_i^{\{1\}}(t) + V_i^{\{2\}}(t))$ is two. As a result, the number of times the temporal self-location $w_i(t)$ is updated using all of the correction vectors is ten. That is, when the number of times the temporal self-location $w_i(t)$ is updated using the correction vectors $(V_i^{\{1\}}(t) + (t) + V_i^{\{10\}}(t))$, $(V_i^{\{1\}}(t) + V_i^{\{9\}}(t))$, ..., $(V_i^{\{1\}}(t) + V_i^{\{3\}}(t))$ is p (p is an integer), the number of times the temporal self-location $w_i(t)$ is updated using all of the correction vectors is generally 8p+2p=10p.

"10" as in the number of times 10p the temporal self-location $w_i(t)$ is updated is equal to "10" as in n=10 in the n-th correction vector, so that the number of times the temporal self-location $w_i(t)$ is updated using all of the correction vectors that is on the right side of the formula (2) is generally np. Therefore, the number of times the temporal self-location $w_i(t)$ is updated using the formula (2) is determined when n is determined and then p is determined.

(Conversion into Absolute Coordinates)

The converter 64 receives a relative estimated location of each fixed node acquired in the step S35 (the temporal self-location $w_i(t)$ of the fixed node the update of which has been completed) from the location updater 63. The converter 64 converts the received relative estimated location of each fixed node into an absolute location using a relative estimated location and an absolute location of an anchor node (step S36).

Letting a true location (=absolute location) of the anchor node be $W_A=(X_A, Y_A)$, and letting the relative estimated location be $w_A=(x_A, y_A)$, the true location $W_A=(X_A, Y_A)$ is expressed by the following formula using the estimated location $w_A=(x_A, y_A)$.

[Formula 4]

$$\left. \begin{aligned} X_A &= ax_A + by_A + t_x \\ Y_A &= cx_A + dy_A + t_y \end{aligned} \right\} \quad (4)$$

6 coefficients a, b, c, d, $t_x$ and $t_y$ are obtained by the simultaneous equation (4) that is formularized for respective three anchor nodes, so that the estimated locations $w_i=(x_i, y_i)$ of all of the fixed nodes are converted into the absolute locations $W_i=(X_i, Y_i)$ by the following formula.

[Formula 5]

$$\begin{pmatrix} X_i \\ Y_i \\ 1 \end{pmatrix} = \begin{pmatrix} a & b & t_x \\ c & d & t_y \\ 0 & 0 & 1 \end{pmatrix} \begin{pmatrix} x_i \\ y_i \\ 1 \end{pmatrix} \quad (5)$$

The converter 64 determines the coefficients a, b, c, d, $t_x$ and $t_y$ using the formula (4), assigns the determined coefficients a, b, c, d, $t_x$ and $t_y$ into the formula (5) and converts all of the relative estimated locations of the fixed nodes N-1 to N-k into the absolute locations.

[3.4. Determination of Topology Conflict (step S37)]

The topology conflict determiner 65 receives the absolute locations of the fixed nodes N-1 to N-k from the converter 64. The topology conflict determiner 65 determines presence or absence of a topology conflict in each fixed node based on the received absolute locations of the fixed nodes N-1 to N-k and calculates a region determination value $V_{T\_AVE}$ (step S37).

(Definition of Topology Conflict)

FIG. 11 is a conceptual diagram showing the topology conflict generated when the locations of the fixed nodes N-1 to N-k shown in FIG. 1 are estimated. As shown in FIG. 11, the fixed node N-i is present in the temporal self-location $w_i(t)$. The first vicinity node (fixed node) is present at a distance of distance $d_1$ from the fixed node N-i, and the second vicinity node (fixed node) is present at a distance of distance $d_2$ from the fixed node N-i.

The number of hops the first vicinity node is at a distance of from the fixed node N-i is 1, and the number of hops the second vicinity node is at a distance of from the fixed node N-i is 2. The distance between nodes is set based on the number of hops as described above. Therefore, in the original topology, the temporal self-location $w_i(t)$ of the fixed node N-i is closer to the first vicinity node than the second vicinity node.

However, the distance $d_2$ is smaller than the distance $d_i$ in FIG. 11, so that the temporal self-location $w_i(t)$ of the fixed node N-i is closer to the second vicinity node than the first vicinity node. This conflicts with the original topology in which the second vicinity node is present at a larger distance from the fixed node N-i than the first vicinity node. In this manner, the temporal self-location $w_i(t)$ of the fixed node N-i, the location of which is to be estimated, being closer to the the second vicinity node than the first vicinity node is referred to as a topology conflict.

As shown in FIG. 11, when a topology conflict is present, topology bending occurs. Here, "topology bending" indicates that the angle formed by the vector directed from the fixed node N-i towards the first vicinity node and the vector directed from the first vicinity node towards the second vicinity node is within the range of 90 to 270 degrees.

(Determination of Presence or Absence of Topology Conflict)

FIG. 12 is a conceptual diagram for explaining the process of determining whether a topology conflict is present.

As shown in FIG. 12(a), the estimated location of the fixed node N-i, the estimated location of the first vicinity node N-j of the fixed node N-i, and the estimated location of the fixed node N-h that is the second vicinity node of the fixed node N-i and the first vicinity node of the first vicinity node N-j are $w_i$, $w_j$ and $w_h$, respectively. Here, i, j and h are integers that are equal to or larger than 1 and equal to or smaller than k, and satisfy the conditions of i≠j, j≠h and h≠i.

When the true location of the fixed node N-h is $W_h$, the estimated location $w_h$ of the fixed node N-h causes topology bending. In this case, a topology conflict for $w_h$ with $w_i$ and $w_j$ as reference points occurs outside of the range $|w_h-w_i|=<|w_j-w_i|$ in which a topology conflict of $w_h$ can be detected (that is, a relation among locations of $w_h$, $w_i$ and $w_j$ satisfy the condition for absence of a topology conflict.) Here, the range $|w_h-w_i|$ is equivalent to the distance $d_2$ shown in FIG. 11, and the range $|w_j-w_i|$ is equivalent to the distance $d_{1i}$ shown in FIG. 11. That is, bending at the estimated location $w_h$ cannot be detected only by simple comparison of the distance $d_1$ with the distance $d_2$.

As such, as shown in FIG. 12(b) and FIG. 12(c), a subject region for determination of a topology conflict is enlarged. As shown in FIG. 12(b), the estimated locations $w_i$, $w_j$ of the fixed nodes N-i, N-j are set as reference points. Then, the space in which the fixed node N-i is arranged is divided into the region close to the estimated location $w_i$ of the fixed node N-i and the region close to the estimated location $w_j$ of N-j using a perpendicular bisector $L1h$ of a line L1 ($L1=w_j-w_i$) that connects these two reference points to each other, and which region of the two divided regions the estimated location $w_h$ of the fixed node N-h is present is judged.

In this case, in the region (the diagonally shaded region) on the left side of the perpendicular bisector $L1_H$, the estimated location $w_h$ of the fixed node N-h is close to the estimated location $w_i$ of the fixed node N-i. In the region on the right side of the perpendicular bisector $L1_H$, the estimated location $w_h$ of the fixed node N-h is close to the estimated location $w_j$ of the fixed node N-j. Because the fixed node N-h is a second vicinity node of the fixed node N-i, $w_h$ must be located in the region close to $w_j$. Therefore, when the estimated location $w_h$ of the fixed node N-h is located in the region (the diagonally shaded region) close to the estimated location $w_i$ of the fixed node N-i ($|w_h-w_i|=<|w_h-w_j|$), it is determined that a topology conflict is present.

Further, in order to enlarge the detection region of a topology conflict caused by bending, the first vicinity node N-g that is common to the fixed node N-i and the fixed node N-j is used as the reference point in addition to the fixed node N-j as shown in FIG. 12(c). Then, the estimated locations $w_g$ of the fixed nodes N-i, N-g are set as the reference points, the space in which the fixed node N-h is arranged is divided into the region close to the estimated location $w_i$ of the fixed node N-i and the region close to the estimated location $w_g$ of the fixed node N-g using the perpendicular bisector $L2_H$ of a line L2 ($L2=w_g-w_i$) connecting these two reference points to each other, and which divided region the estimated location $w_h$ of the fixed node N-h is present is judged.

In this case, in the region (the diagonally shaded region) on the left side of the perpendicular bisector $L2_H$, the estimated location $w_h$ of the fixed node N-h is close to the estimated location $w_i$ of the fixed node N-i. In the region on the right side of the perpendicular bisector $L2_H$, the estimated location $w_h$ of the fixed node N-h is close to the estimated location $w_g$ of the fixed node g.

Because the fixed node N-h is the second vicinity node of the fixed node N-i, $w_h$ must be located in the region close to the estimated location $w_g$. Therefore, when the estimated location $w_h$ of the fixed node N-h is located in the region (the diagonally shaded region) close to the estimated location $w_i$ of the fixed node N-i ($|w_h-w_i|=<|w_h-w_g|$), the topology conflict determiner 65 determines that a topology conflict is present.

In the region determination shown in FIG. 12(c), the combination of the common first vicinity nodes is changed multiple times. Then, as a result of determination made with the multiple combinations, when the region determination value $V_T$ obtained by the formula (6) is higher than the predetermined threshold value, it is finally determined that a topology conflict is present in the fixed node N-i.

[Formula 6]

$$V_\tau = \frac{a}{A} \quad (6)$$

In the formula (6), $V_T$ indicates the region determination value in the fixed node N-i, 'A' indicates the number of times determination of presence or absence of a topology conflict is made using a common first vicinity group in the fixed node N-i, and 'a' indicates the number of occurrences of topology conflicts. Here, the common first vicinity group is constituted by the fixed nodes that are the first vicinity nodes of the fixed node N-i, which is the basis for determination of a topology conflict, and the first vicinity nodes of the fixed node N-h that is the second vicinity node of the fixed node N-i. The region determination value $V_T$ is a numerical value that is equal to or higher than 0 and equal to or lower than 1, and the smaller the number of occurrences of topology conflicts in the fixed node N-i that is a subject of determination is, the closer the value is to 0.

In this manner, presence or absence of a topology conflict is determined in each of the fixed nodes N-1 to N-k, whereby the detection region for a topology conflict caused by bending can be enlarged, and a topology conflict caused by bending can be effectively detected.

The topology conflict determiner 65 calculates the region determination value $V_T$ for each of the fixed nodes N-1 to N-k by determining presence or absence of a topology conflict based on each of the fixed nodes N-1 to N-k. The topology conflict determiner 65 calculates the region determination value $V_{T\_AVE}$ that is an average value of the region determination value $V_T$ for each of the fixed nodes N-1 to N-k, and outputs the region determination value $V_{T\_AVE}$ to the virtual topology producer 66. Similarly to the region determination value $V_T$, the region determination value $V_{T\_AVE}$ is a numerical value that is equal to or higher than 0 and equal to or lower than 1, and the smaller the number of occurrences of topology conflicts in the fixed node N-1 to N-k is, the closer the value is to 0.

Since being obtained from the estimated locations of the fixed nodes N-1 to N-k based on the fixed topology, the region determination value $V_{T\_AVE}$ calculated in the above-mentioned steps corresponds to the fixed topology. As described below, the region determination value $V_{T\_AVE}$ is obtained from the estimated locations of the fixed nodes N-1 to N-k based on the virtual topology. That is, the region determination value $V_{T\_AVE}$ and the topology have one-to-one correspondence with each other.

[3.5. Output of Result of Location Estimation (Step S38 to S40)]

Here, the flow of the steps S38 to S40 will be described. Details of the process of producing a virtual topology (step S38) will be described below.

As shown in FIG. 10, the virtual topology producer 66 receives the region determination value $V_{T\_AVE}$ and produces a new virtual topology using the received region determination value $V_{T\_AVE}$ (step S38). The arrangement relationship of a fixed node N-1 with other nodes shown by the virtual topology is different from the arrangement relationship of a fixed node with other nodes shown by the fixed topology. Details of the step S38 will be described below.

When the virtual topology producer 66 produces a virtual topology (No in the step S39), the location estimation device 5 re-estimates the location of each fixed node using the produced virtual topology (step S34 to S36) and re-calculates the region determination value $V_{T\_AVE}$ based on the estimated location of the fixed node (step S37). That is, the location estimation device 5 calculates the region determination value $V_{T\_AVE}$ corresponding to the virtual topology.

The location estimation device 5 repeats the steps S34 to S39 until the virtual topology producer 66 determines to end the production of virtual topologies (Yes in the step S39). When the virtual topology producer 66 determines to end the production of virtual topologies (yes in the step S39), the location estimation device 5 outputs the results of location estimation of the fixed nodes N-i to N-k (step S40). Specifically, the virtual topology producer 66 specifies the lowest region determination value $V_{T\_AVE}$ out of the acquired region determination values $V_{T\_AVE}$ and specifies the topology corresponding to the lowest region determination value $V_{T\_AVE}$ from among the fixed topologies and the virtual topologies. The virtual topology producer 66 outputs the absolute locations of the fixed nodes N-i to N-k acquired from the specified topology as a result of location estimation (step S40). Thus, the process of estimating the location of the fixed node (step S3) ends.

[3.6. Production of Virtual Topology (step S38)]

Details of the step S38 will be described below. The virtual topology producer 66 receives the region determination value $V_{T\_AVE}$ from the topology conflict determiner 65 and produces the virtual topology for fixed nodes based on the received region determination value $V_{T\_AVE}$ (step S38). The virtual topology is set based on the virtual wireless communication distance, which is virtually set as the distance that enables each fixed node to directly receive an advertisement packet from another fixed node. Hereinafter, the virtual wireless communication distance is referred to as the "distance between virtual nodes."

The virtual topology producer 66 updates the distance between virtual nodes every time receiving a region determination value $V_{T\_AVE}$ and produces the virtual topology based on the updated distance between virtual nodes. Then, as described above, the location of each fixed node is re-estimated based on the produced virtual topology, and the region determination value $V_{T\_AVE}$ corresponding to the produced virtual topology is calculated.

[3.6.1. Relationship Between Location Estimation Error and Wireless Communication Distance]

First, an optimal wireless communication distance that can minimize a location estimation error of the fixed nodes N-1 to N-k will be described.

Figure 13:
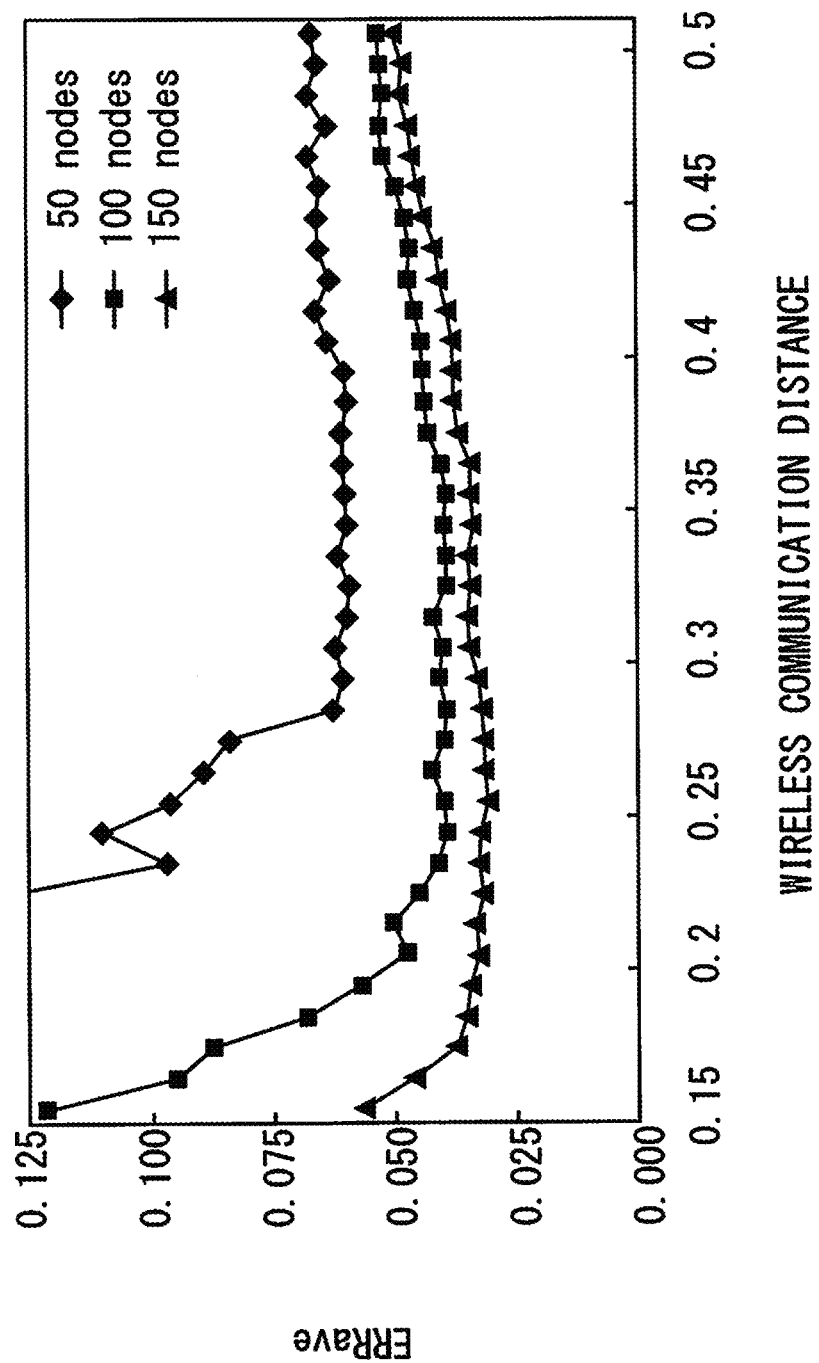
FIG. 13 is a graph showing the relationship between a communication range of fixed nodes and a location estimation error when the locations of the fixed nodes that are designated in advance are estimated using the conventional technique.

FIG. 13 is the graph showing the relationship between the wireless communication distance for fixed nodes and the location estimation error in the case where absolute locations of the fixed nodes are preset, when the location of each fixed node is estimated by the method shown in the Non-Patent Document 1. Specifically, with the method shown in the Non-Patent Document 1, the location of each fixed node is estimated using only the steps S31 to S36 out of the steps shown in FIG. 10. In FIG. 13, the abscissa indicates the wireless communication distance of one hop (the wireless communication distance that enables direct reception of an advertisement packet), and the ordinate indicates the location estimation error.

As shown in FIG. 13, either when the number of nodes is 50, 100 or 150, it is found that the graph for the location estimation error roughly projects downward in a range on the abscissa with respect to the wireless communication distance. This means that there is the optimal wireless communication distance that can minimize the location estimation error of the fixed nodes.

When the wireless communication distance is shorter than the optimal wireless communication distance, the number of first vicinity nodes for each fixed node is reduced, and the topology information of the first vicinity nodes used for the location estimation of fixed nodes becomes insufficient. As a result, the shorter the wireless communication distance is than the optimal wireless communication distance, the more rapidly the accuracy of location estimation degrades.

On the other hand, when the wireless communication distance is longer than the optimal wireless communication distance, the number of fixed nodes at a distance of 1 hop from a fixed node increases. In this case, the resolution of hops is lowered in the topology information of the first vicinity nodes of the basis fixed node. That is, a plurality of fixed nodes that are at various distances from the basis fixed node are collectively treated as the first vicinity nodes, so that the difference between the communication distance obtained from the number of hops (step S33, see FIG. 10) and the actual wireless communication distance increases. As a result, the longer the wireless communication distance is than the optimal wireless communication distance, the more degraded the accuracy of location estimation becomes.

Therefore, if the smallest location estimation error or the optimal wireless communication distance can be specified, the location of a fixed node can be estimated with high accuracy. However, the true location of each fixed node is unknown except for the anchor nodes, so that the location estimation device 5 cannot acquire the location estimation error. Further, the method of controlling the wireless communication distance of each fixed node by controlling the transmission power of each fixed node is considered in order to specify the optimal wireless communication distance. However, controlling the transmission power of each fixed node for the location estimation is not realistic in consideration of a process load on each fixed node.

Then, the location estimation device 5 uses the distance between virtual nodes instead of the actual wireless communication distance and uses the region determination value $V_{T\_AVE}$ instead of the location estimation error. The location estimation device 5 searches for the lowest region determination value $V_{T\_AVE}$ corresponding to the optimal wireless communication distance and outputs the absolute location obtained from the topology corresponding to the lowest region determination value $V_{T\_AVE}$, which is obtained as a result of search, as the result of location estimation.

The reason why the region determination value $V_{T\_AVE}$ can be used instead of the location estimation error will be explained. The region determination value $V_{T\_AVE}$ indicates the frequency of occurrence of a topology conflict when the location of each fixed node in the wireless network 10 is estimated. The closer the region determination value $V_{T\_AVE}$ becomes to 0, the less topology conflict relating to the estimated location of each sensor node occurs. Further, it can be considered that the location of each fixed node is estimated with high accuracy.

Figure 14:
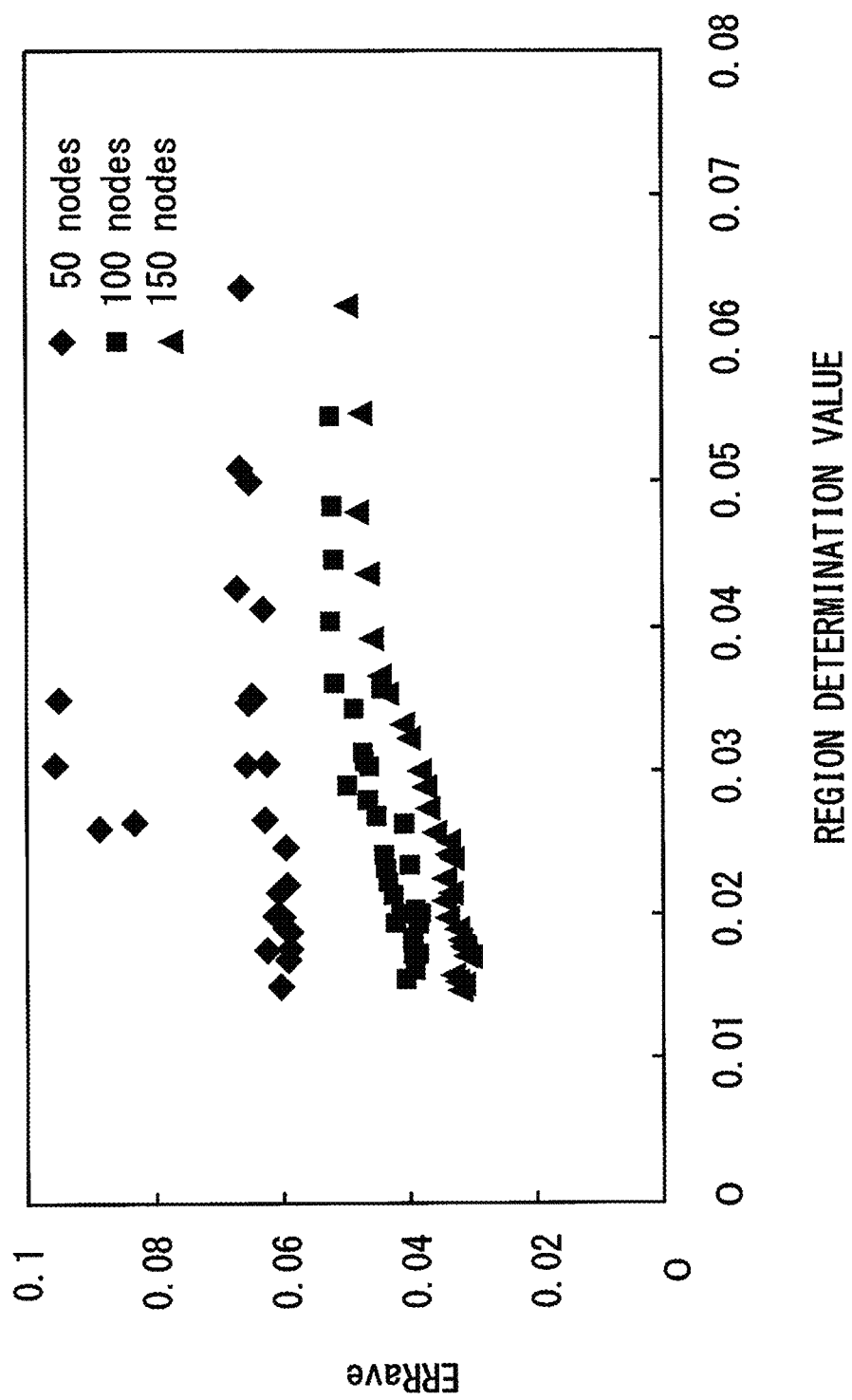
FIG. 14 is a graph showing the relationship between the location estimation error of the fixed nodes and the region determination values calculated by a topology conflict determiner shown in FIG. 7.

FIG. 14 is the graph indicating the relationship between the location estimation error of a fixed node and the region determination value when the communication distance is set to 0.15 to 0.5. The location estimation error of the fixed node shown in FIG. 14 is the same as the location estimation error shown in FIG. 13. FIG. 14 shows the certain correlation that the lower the region determination value is, the smaller the location estimation error is. Therefore, when the lowest region determination value $V_{T\_AVE}$ is specified, and the location of each fixed node is estimated based on the virtual topology corresponding to the specified region determination value $V_{T\_AVE}$, the error of the estimated location is presumed to be extremely small.

[3.6.2. Outline of Virtual Topology]

Figure 15:
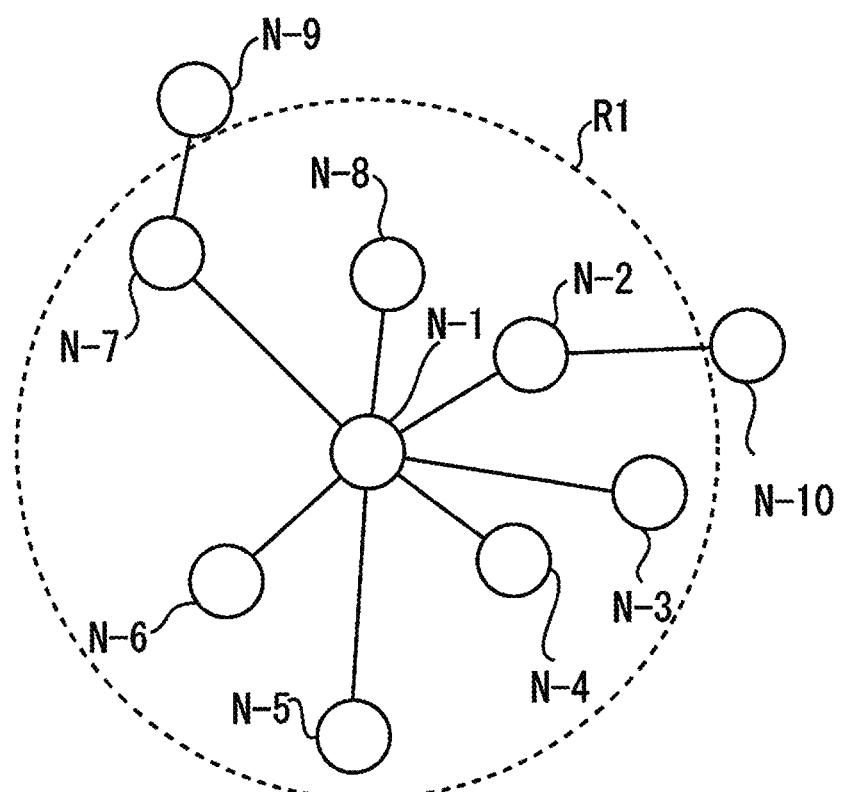
FIG. 15 is a diagram showing one example of the coverage of the fixed nodes shown in FIG. 1.

The difference between the fixed topology and the virtual topology will be explained. FIG. 15 is a diagram showing one example of the coverage of the fixed node N-1. In FIG. 15, the solid lines connecting the fixed nodes N-1 to N-10 to one another indicates an actual wireless communication link. A region R1 indicates the actual coverage of the fixed node N-1. The actual wireless communication distance of the fixed node N-1 is equivalent to the radius of the region R1.

As shown in FIG. 15, the fixed node N-1 can directly communicate with the fixed nodes N-2 to N-8 located in the region R1. That is, the fixed nodes N-2 to N-8 are first vicinity nodes of the fixed node N-1, and the identification information of the fixed nodes N-2 to N-8 is registered in the neighbor node information of the fixed node N-1. The fixed nodes N-9, N-10 located outside of the region R1 are the second vicinity nodes of the fixed node N-1.

Figure 16:
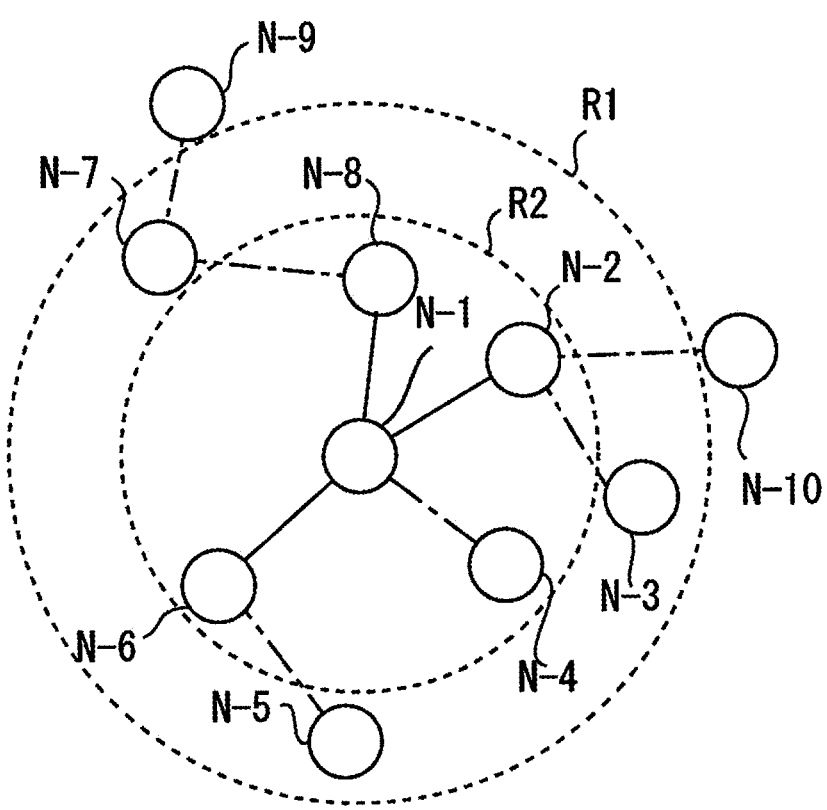
FIG. 16 is a diagram showing one example of the virtual coverage of the fixed nodes shown in FIG. 1.

FIG. 16 is a diagram showing the virtual coverage of the fixed node N-1 based on the distance between virtual nodes. In FIG. 16, the region R2 is the virtual coverage of the fixed node N1, and the radius of the region R2 is equivalent to the distance between virtual nodes. That is, FIG. 16 shows the virtual first vicinity nodes of the fixed node N-1 when the distance between virtual nodes is set to be smaller than the actual wireless communication distance. The virtual first vicinity nodes of the fixed node N-1 are the fixed nodes N-2, N-4, N-6, N-8.

That is, the distance between virtual nodes is set to be shorter than the actual wireless communication distance, whereby the number of first vicinity nodes of the fixed node N-1 can be virtually reduced. Further, the distance between virtual nodes is set to be longer than the actual wireless communication distance, whereby the number of first vicinity nodes of the fixed node N-1 can be virtually increased.

In this manner, it is possible to produce a plurality of virtual topologies different from the fixed topology (the topology produced based on the neighbor node information) produced in the step S32 by virtually changing the first vicinity nodes of the fixed node N-1.

[3.6.3. Outline of Steps of Producing Virtual Topology (step S38)]

As described above, the location estimation device 5 searches for the lowest region determination value $V_{T\_AVE}$. However, the average of the location estimation error is used in the graph shown in FIG. 13, and the actual variation range of the location estimation error is larger than the variation range shown in FIG. 13. Therefore, when the lowest value of the region determination value $V_{T\_AVE}$ is specified using a steepest descent method, a local solution of the region determination value $V_{T\_AVE}$ may be specified erroneously as a lowest value.

As such, the virtual topology producer 66 searches for the lowest region determination value $V_{T\_AVE}$ based on the following steps. Specifically, the virtual topology producer 66 stores the lowest region determination value $V_{T\_AVE}$ from among the calculated region determination values $V_{T\_AVE}$. The virtual topology producer 66 assumes that there is the distance between virtual nodes that is close to the distance between virtual nodes corresponding to the currently stored region determination value $V_{T\_AVE}$ and can reduce the currently stored region determination value $V_{T\_AVE}$.

The virtual topology producer 66 updates the distance between virtual nodes to more sufficiently reduce the currently stored region determination value $V_{T\_AVE}$ and produces a new virtual topology based on the updated distance between virtual nodes. The virtual topology producer 66 compares the region determination value $V_{T\_AVE}$ obtained from the new virtual topology with the currently stored region determination value $V_{T\_AVE}$. The virtual topology producer 66 searches for the lowest region determination value $V_{T\_AVE}$ by repeating these processes.

The virtual topology producer 66 makes a judgement whether to continue searching for the lowest region determination value $V_{T\_AVE}$ based on the below-mentioned ideas of (1) and (2).

(1) When the update rate of the lowest value of the region determination value $V_{T\_AVE}$ is high, a new lowest value is likely to be discovered. Therefore, it is necessary to continue searching for the lowest value.

(2) When the update rate of the lowest value of the region determination value $V_{T\_AVE}$ is low, the lowest value of the region determination value $V_{T\_AVE}$ is likely to have been found.

That is, when the update rate of the lowest value of the region determination value $V_{T\_AVE}$ is equal to or higher than a present threshold value, the virtual topology producer 66 continues to search for a new virtual topology. On the other hand, when the update rate of the lowest value of the region determination value $V_{T\_AVE}$ is lower than the above-mentioned threshold value, the virtual topology producer 66 makes a judgement that the lowest region determination value $V_{T\_AVE}$ has been specified, and determines to end the production of a virtual topology.

[3.7. Specific Process of Producing Virtual Topology (step S38)]

[3.7.1. Setting of Virtual Topology for First Time]

Figure 17:
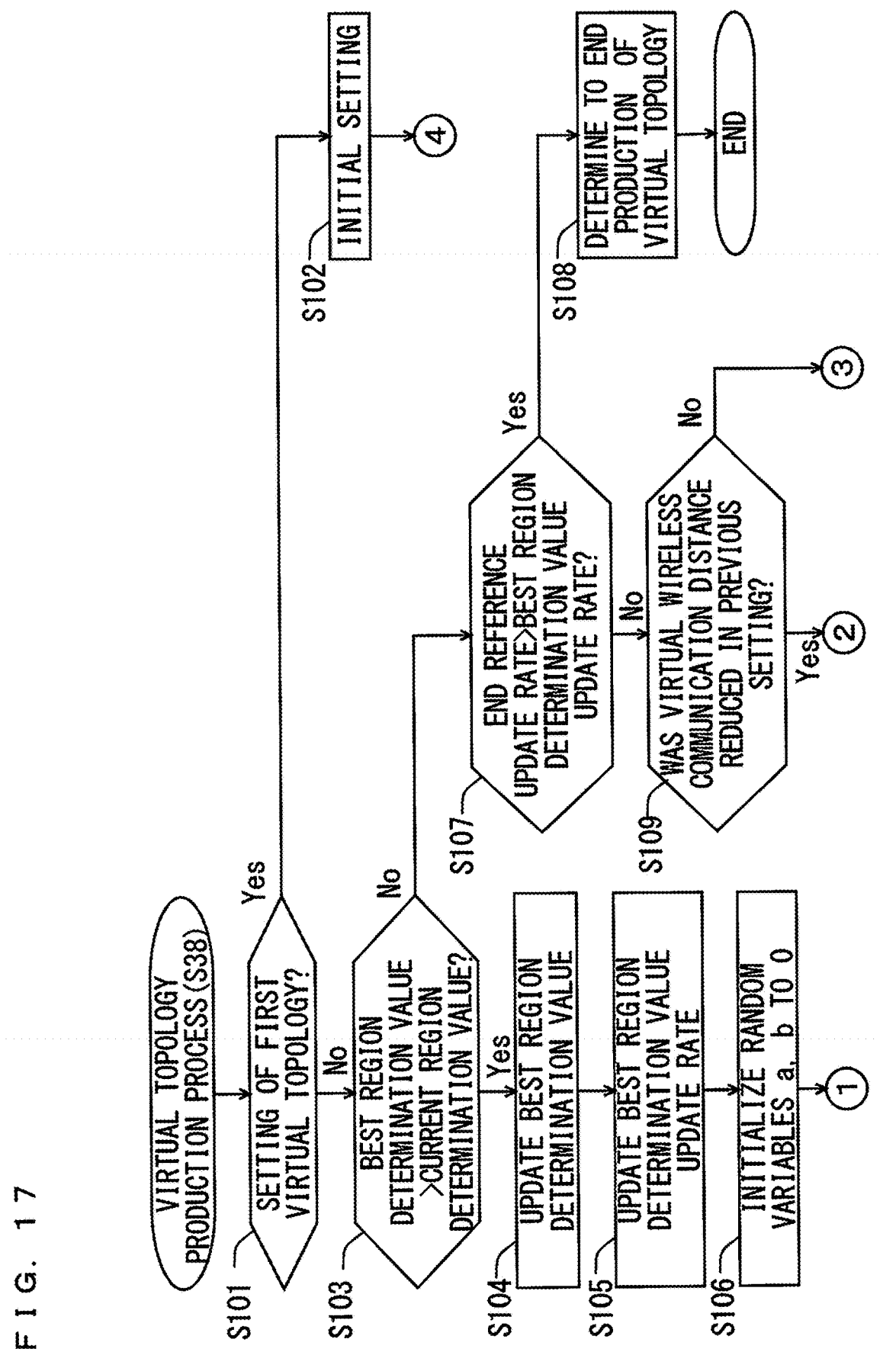
FIG. 17 is a flow chart showing an operation of a virtual topology producer shown in FIG. 7.
Figure 18:
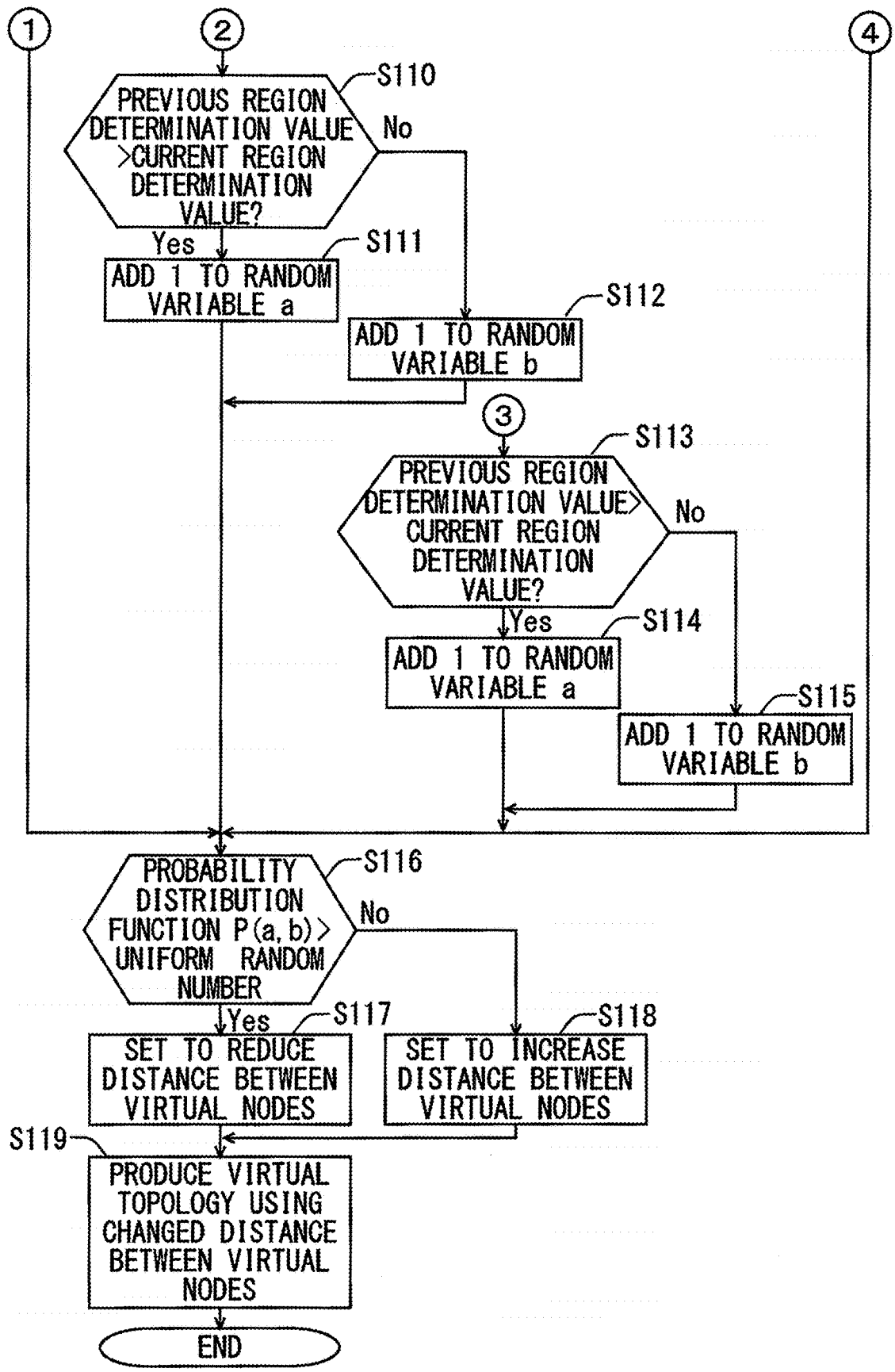
FIG. 18 is a flow chart showing the operation of the virtual topology producer shown in FIG. 7.

FIGS. 17 and 18 are flow charts showing the operation of the virtual topology producer 66. Details of the production of the virtual topology (step S38, see FIG. 10) will be described below with reference to FIGS. 17 and 18.

When receiving the region determination value $V_{T\_AVE}$ corresponding to the fixed topology from the topology conflict determiner 65, the virtual topology producer 66 makes a judgement whether a virtual topology has already been produced (step S101). When the virtual topology has not been produced in the location estimation of the fixed node (Yes in the step S101), the virtual topology producer 66 initializes the parameter used for the search of the lowest region determination value $V_{T\_AVE}$ (step S102).

Specifically, the virtual topology producer 66 sets a best region determination value, a best region determination value update rate, an end reference update rate, random variables a, b and the distance between virtual nodes in the step S201.

The best region determination value is the lowest region determination value $V_{T\_AVE}$ out of the region determination values $V_{T\_AVE}$ respectively corresponding to the virtual topology and the fixed topology. In the step S102, the region determination value $V_{T\_AVE}$ that is input first in the virtual topology producer 66 is set as the best region determination value.

The best region determination value update rate indicates the frequency of update of the best region determination value, and is a numerical value that is equal to and higher than 0 and equal to or lower than 1. Specifically, the best region determination value update rate is obtained by division of the number of times the best region determination value $V_{T\_AVE}$ is updated by the total number of the fixed topologies and the produced virtual topologies. In the step S102, the best region determination value is updated by the input of the initial region determination value $V_{T\_AVE}$, so that the best region determination value update rate is set to 1.

The end reference update rate is a threshold value for judgement of whether to end the production of virtual topologies. In the step S102, the virtual topology producer 66 initializes the random variables a, b of the probability distribution function P (a, b) to 0. Details of the probability distribution function P (a, b) will be described below.

Further, the virtual topology producer 66 sets the initial value of the distance between virtual nodes. The virtual topology producer 66 calculates the average value of the distances between the fixed node and the first vicinity nodes registered in the neighbor node information based on an absolute location of each fixed node converted by the converter 64 and the neighbor node information of the fixed node. The average distance obtained by calculation is used as the initial value of the distance between virtual nodes. The initial value of the distance between virtual nodes that is set in this manner is equivalent to the virtual wireless communication distance of the fixed topology.

After the step S102, the virtual topology producer 66 proceeds to the step S116 shown in FIG. 18. The virtual topology producer 66 produces uniformly distributed random numbers that are equal to or larger than 0 and equal to or smaller than 1, and compares the produced random numbers with the probability distribution function P (a, b) (step S116).

When the probability distribution function P (a, b) is larger than a random number (Yes in the step S116), the distance between virtual nodes is reduced by the virtual topology producer 66 to be smaller than the current distance between virtual nodes (step S117). On the other hand, when the probability distribution function P (a, b) is equal to or smaller than a random number (No in the step S116), the distance between virtual nodes is increased to be larger than the current distance between virtual nodes (step S118).

Here, details of the probability distribution function P (a, b) will be described. As described above, the probability distribution function P (a, b) is used to determine whether to reduce or increase the distance between virtual nodes. The probability distribution function P (a, b) is expressed by the formula (7).

[Formula 7]

$$P(a, b) = \frac{a+1}{a+b+2} \quad (7)$$

In the formula (7), the random variable 'a' is the sum of the number of cases where the region determination value $V_{T\_AVE}$ is reduced when the distance between virtual nodes is reduced, and the number of cases where the region determination value $V_T$ AVE is increased when the distance between virtual nodes is increased. That is, the random variable 'a' indicates the number of times the region determination value $V_{T\_AVE}$ is reduced in the case where the distance between virtual nodes is reduced.

The random variable 'b' is the sum of the number of cases where the region determination value $V_{T\_AVE}$ is reduced when the distance between virtual nodes is increased and the number of cases where the region determination value $V_{T\_AVE}$ is increased when the distance between virtual nodes is reduced. That is, the random variable 'b' indicates the number of times the region determination value $V_{T\_AVE}$ is reduced in the case where the distance between virtual nodes is increased.

Whether to reduce the distance between virtual nodes is determined based on the result of comparison between the probability distribution function P (a, b) and the random number as shown in the step S116. The closer the probability distribution function P (a, b) is to 1, the more probable the distance between virtual nodes is to be reduced. The closer the probability distribution function P (a, b) is to 0, the more probable the distance between virtual nodes is to be increased.

When the probability distribution function is close to 0.5, whether to reduce or increase the distance between virtual nodes is randomly determined. Whether to reduce or increase the distance between virtual nodes is not determined at the time of first production of a virtual topology. Therefore, in the step S102, the virtual topology producer 66 randomly determines whether to reduce or increase the distance between virtual nodes by setting the random variables a, b to 0.

Next, the process of reducing the distance between virtual nodes (step S117) is explained. When starting the process shown in FIGS. 17 and 18, the virtual topology producer 66 acquires the neighbor node information of a fixed node and acquires an absolute location of each fixed node from the converter 64.

Then, the virtual topology producer 66 reduces the distance between virtual nodes such that the number of first vicinity nodes for at least one fixed node out of the fixed nodes N-1 to N-k is reduced. The number of first vicinity nodes may be reduced by 1 or more. As shown in FIG. 16, the distance between virtual nodes is set to the radius of the region R1, by way of example. In this case, when the distance between virtual nodes is reduced from the radius of the region R1 to the radius of the region R2, the number of first vicinity nodes of the fixed node N-1 is reduced from 7 to 4.

On the other hand, when performing the process of increasing the distance between virtual nodes (step S118), the virtual topology producer 66 increases the distance between virtual nodes such that the number of the first vicinity nodes for at least one fixed node out of the fixed nodes N-1 to N-k is increased. The number of first vicinity nodes may be increased by 1 or more. As shown in FIG. 16, the distance between virtual nodes is set to the radius of the region R1, by way of example. In this case, the distance between virtual nodes may be increased to be larger than the radius of the region R1 such that the fixed node N-9 becomes a first vicinity node of the fixed node N-1.

The virtual topology producer 66 produces the virtual topology based on the changed distance between virtual nodes (step S119). Specifically, the virtual topology producer 66 specifies another fixed node that is within the range of the distance between virtual nodes that has been changed in the step S117 or S118 as a first vicinity node of the fixed node N-i based on the absolute location of the fixed node N-i, thereby producing the virtual neighbor node information about the fixed node N-i. Then, the virtual topology producer 66 produces the virtual topology of each fixed node based on the virtual neighbor node information in the step similar to the step S2.

The location updater 63 receives a virtual topology from the virtual topology producer 66 and updates the temporal self-location of each fixed node based on the received virtual topology, thereby estimating the location of each fixed node. When estimating the location of each fixed node based on the virtual topology, the location updater 63 may use a random temporal self-location that is newly produced by the self-location producer 62 or may use the estimated location that is estimated based on the last topology or the virtual topology.

[3.7.2. When Best Region Determination Value is Updated]

The second and subsequent production of the virtual topology will be described. Hereinafter, the region determination value $V_{T\_AVE}$ received by the virtual topology producer 66 from the topology conflict producer 65 is referred to as a "current region determination value," and the virtual topology corresponding to the current region determination value V is referred to as "current virtual topology."

As shown in FIG. 17, when receiving the current region determination value from the topology conflict determiner 65, the virtual topology producer 66 makes a judgement whether the virtual topology is produced for the first time (step S101). When the virtual topology has already been produced (No in the step S101), the virtual topology producer 66 compares the current region determination value with the best region determination value (step S103).

When the current region determination value is smaller than the best region determination value (Yes in the step S103), the virtual topology producer 66 updates the best region determination value with the current region determination value (step S104) and updates the best region determination value update rate (step S105).

When the best region determination value is updated, the distance between virtual nodes with which a lower region determination value $V_{T\_AVE}$ can be obtained may be close to the distance between virtual nodes used for the production of the current virtual topology as described above. The virtual topology producer 66 re-initializes the respective random variables a, b to 0 in order to search for a lower region determination value $V_{T\_AVE}$ (step S106). Thus, the value of the probability distribution function P (a, b) is 0.5, so that how the distance between virtual nodes that is used for the setting of the current virtual topology is to be corrected is determined randomly.

The virtual topology producer 66 compares the probability distribution function P (a, b) with a random number (step S116) and performs the process of reducing the distance between virtual nodes (step S117) and the process of increasing the distance between virtual nodes (step S118) based on the result of comparison.

[3.7.3. When Best Region Determination Value is Not Updated]

As shown in FIG. 17, when receiving the current region determination value from the topology conflict determiner 65, the virtual topology producer 66 makes a judgement whether the virtual topology is produced for the first time (step S101). When the virtual topology has already been produced (No in the step S101), the virtual topology producer 66 compares the current region determination value with the best region determination value (step S103).

When the current region determination value is equal to or higher than the best region determination value (No in the step S103), the virtual topology producer 66 compares the best region determination value update rate with the end reference update rate (step S107). The case where the best region determination value update rate is lower than the end reference update rate (Yes in the step S107) will be described below.

When the best region determination value update rate is equal to or higher than the end reference update rate (No in the step S107), the virtual topology producer 66 continues to search for the lowest value since a new lowest value is likely to be found.

Specifically, when producing the current virtual topology, the virtual topology producer 66 makes a judgement whether the distance between virtual nodes has been reduced (step S109). That is, the virtual topology producer 66 compares the distance between virtual nodes used for the production of the current virtual topology with the distance between virtual nodes used for the production of the last topology. Here, the last topology is the topology (fixed topology or virtual topology) that is produced immediately before the current virtual topology.

In the case where the distance between virtual nodes used for the production of the current virtual topology is smaller than the distance between virtual nodes used for the production of the last topology, the virtual topology producer 66 makes a judgement that the distance between virtual nodes has been reduced when producing the current virtual topology.

When the distance between virtual nodes has been reduced (Yes in the step S109), the virtual topology producer 66 proceeds to the step S110 shown in FIG. 18 and compares the current region determination value with the previous region determination value (step S110). The previous region determination value corresponds to the last virtual topology. When the current region determination value is compared to the previous region determination value, it is judged whether the region determination value $V_{T\_AVE}$ is likely to be reduced or increased.

The previous region determination value being higher than the current region determination value (Yes in the step S110) corresponds to the case where the region determination value $V_{T\_AVE}$ is reduced when the distance between virtual nodes is reduced. In this case, when the distance between virtual nodes is further reduced, an even lower region determination value $V_{T\_AVE}$ may be obtained. When the random variable 'a' is increased, the probability distribution function P (a, b) becomes close to 1. Thus, the probability distribution function P (a, b) is likely to be larger than a uniformly distributed random number. As a result, the process of reducing the communication distance between nodes (step S117) is likely to be performed. The virtual topology producer 66 adds 1 to the random variable 'a' in order to reduce the distance between virtual nodes (step S111).

On the other hand, the previous region determination value being equal to or lower than the current region determination value (No in the step S110) corresponds to the case where the region determination value is increased when the distance between virtual nodes is reduced. In this case, when the distance between virtual nodes is increased, an even lower region determination value $V_{T\_AVE}$ may be obtained. When the random variable b is increased, the probability distribution function P (a, b) becomes close to 0. Thus, the probability distribution function P (a, b) is likely to be equal to or smaller than a uniformly distributed random number. As a result, the process of increasing the distance between virtual nodes (step S118) is likely to be performed. The virtual topology producer 66 adds 1 to the random variable 'b' in order to increase the distance between virtual nodes (step S112).

The virtual topology producer 66 calculates the probability distribution function (a, b) using the updated random variables a or b and compares the calculated probability distribution function P (a, b) with the uniformly distributed random number (step S116). As described above, the virtual topology producer 66 performs the process of reducing the distance between virtual nodes (step S117) or the process of increasing the distance between virtual nodes (step S118) depending on the result of comparison.

The virtual topology producer 66 refers to the virtual topology that is produced immediately before in performing the step S117 or S118. Specifically, the virtual topology producer 66 determines a change amount of the distance between virtual nodes with reference to the first vicinity nodes of the fixed node N-i in the virtual topology that is produced immediately before.

The virtual topology producer 66 produces the virtual topology based on the distance between nodes that is changed in the step S117 or S118 (step S119). In this manner, it is possible to control an increase or a reduction in distance between virtual nodes by using the random variables a, b, in the probability distribution function P (a, b).

Returning to the explanation of the step S109 (see FIG. 17), in the case where the distance between virtual nodes is increased at the time of setting of the previous virtual topology (No in the step S109), the virtual topology producer 66 proceeds to the step S113 shown in FIG. 18 and compares the current region determination value with the previous region determination value. Whether the region determination value $V_{T\_AVE}$ is likely to be reduced or increased is judged by comparison between the current region determination value and the previous region determination value.

The case where the previous region determination value is higher than the current region determination value (Yes in the step S113) corresponds to the case where the region determination value is reduced when the distance between virtual nodes is increased. In this case, similarly to the step S112, an even lower region determination value $V_{T\_AVE}$ is likely to be obtained by a increase in distance between virtual nodes. Therefore, the virtual topology producer 66 adds 1 to the random variable 'b' (step S114).

On the other hand, the case where the previous region determination value is equal to or lower than the current region determination value (No in the step S113) corresponds to the case where the region determination value $V_{T\_AVE}$ is increased when the distance between virtual nodes is increased. In this case, similarly to the step S111, an even lower region determination value is likely to be obtained by an reduction in distance between virtual nodes. Therefore, the virtual topology producer 66 adds 1 to the random variable 'a' (step S115).

The virtual topology producer 66 calculates the probability distribution function P (a, b) using the updated random variable a or b and compares the calculated probability distribution function P (a, b) with the uniformly distributed random number (step S116). As described above, the virtual topology producer 66 performs the process of reducing the distance between virtual nodes (step S117) or the process of increasing the distance between virtual nodes (step S118) depending on the result of comparison. The virtual topology producer 66 produces the virtual topology based on the distance between nodes that is changed in the step S117 or S118 (step S119).

Figure 19:
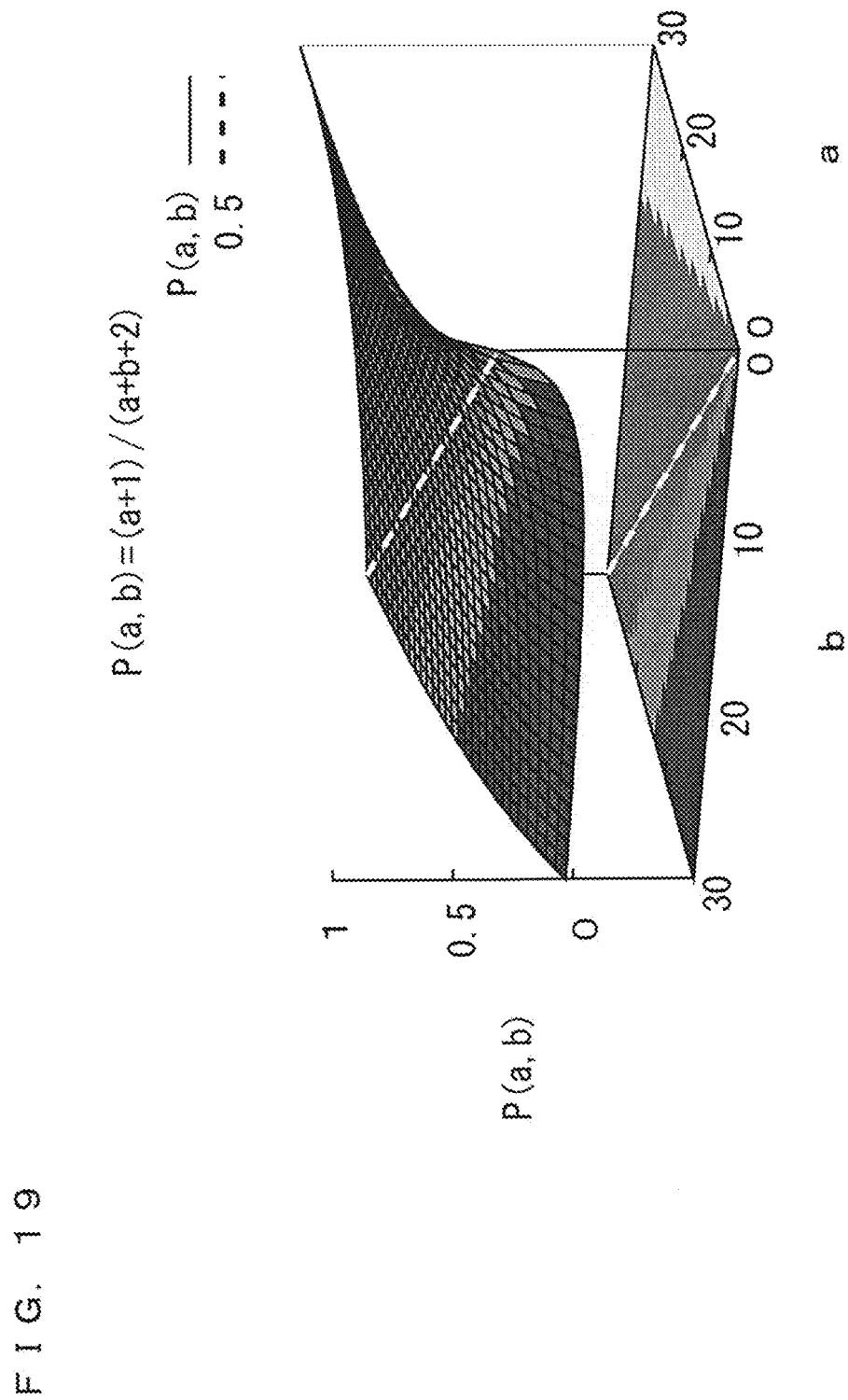
FIG. 19 is a graph showing one example of probability distribution function used in the step S116 shown in FIG. 18.
Figure 20:
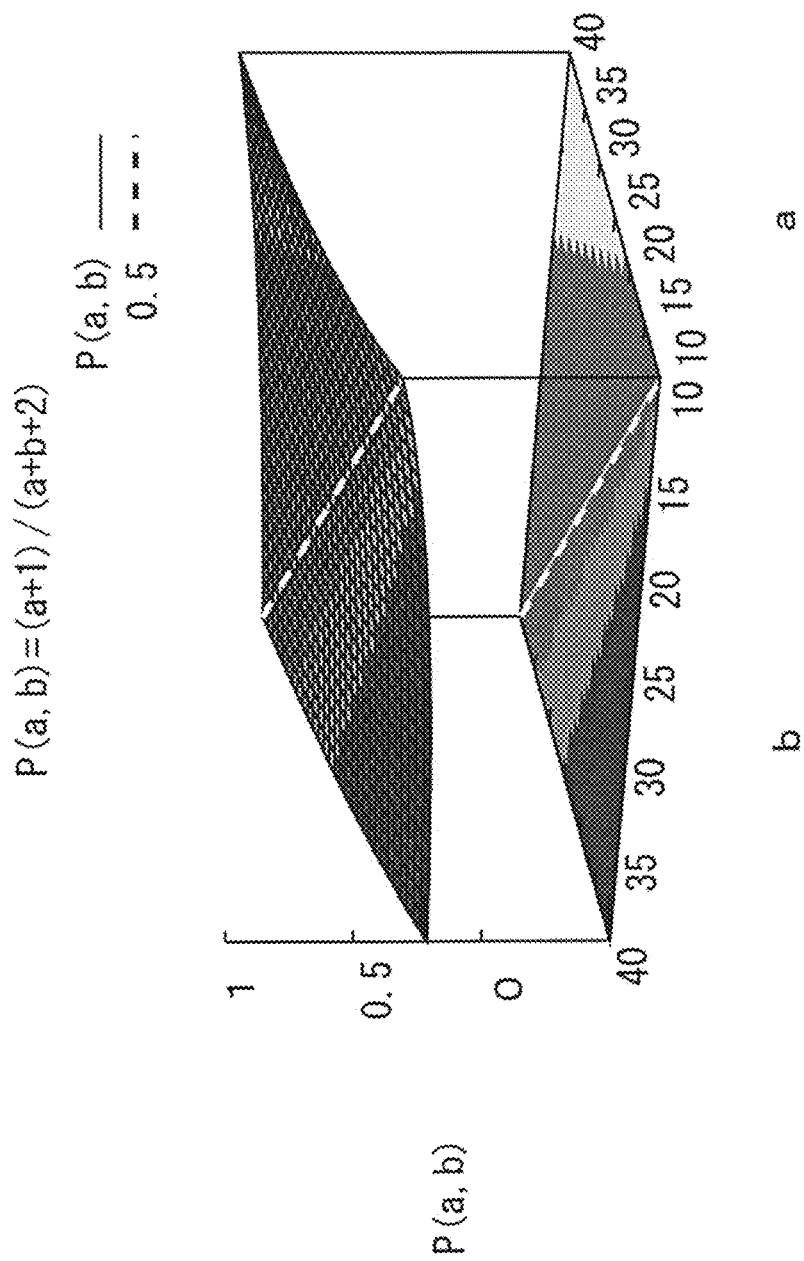
FIG. 20 is a graph showing one example of the probability distribution function used in the step S116 shown in FIG. 18.

Here, a specific example of the probability distribution function P (a, b) will be described. FIGS. 19 and 20 are the graphs showing the specific example of the probability distribution function P (a, b). FIG. 19 shows the shape of distribution of the probability distribution function P (a, b) when the ratio (a/b) of the random variable a to b is far from 1. FIG. 18 shows the shape of distribution of the probability distribution function P (a, b) when the ratio (a/b) of the random variable a to b is close to 1.

As shown in FIGS. 19 and 20, when the region determination value $V_{T\_AVE}$ is searched for the s-th time (s is an integer that is equal to or larger than 2) after initialization of the random variables a, b, behavior of the probability distribution function P (a, b) changes according to the ratio (a/b) of the random variable a to b.

When the radio (a/b) of the random variable a to b is far from 1, the probability distribution function P (a, b) acts intensely to reduce or increase the distance between virtual nodes as shown in FIG. 19. Specifically, when the ratio (a/b) of the random variable a to b is higher than 1, the probability distribution function P (a, b) becomes close to 1. Therefore, the distance between virtual nodes is likely to be reduced. That is, the region determination value $V_{T\_AVE}$ is searched with the intent of reducing the distance between virtual nodes. On the other hand, when the ratio (a/b) of the random variable a to b is smaller than 1, the probability distribution function P (a, b) becomes close to 0. Thus, the distance between virtual nodes is likely to be increased. That is, the region determination value $V_{T\_AVE}$ is searched with the intent of increasing the distance between virtual nodes.

Further, when the ratio (a/b) of the random variable a to b is close to 1, the probability of reducing the distance between virtual nodes for the probability distribution function P (a, b) and the probability of increasing the distance between virtual nodes for the probability distribution function P (a, b) become close to 0.5 as shown in FIG. 20. In this case, whether the distance between virtual nodes is to be reduced or increased is not clear, so that the search is carried out for both cases.

[3.7.4. End of Production of Virtual Topology]

As shown in FIG. 17, when receiving the current region determination value from the topology conflict determiner 65, the virtual topology producer 66 determines whether a virtual topology is produced for the first time (step S101). When a virtual topology has already been produced (No in the step S101), the virtual topology producer 66 compares the current region determination value with the best region determination value (step S103).

When the best region determination value is equal to or lower than the current region determination value (No in the step S103), the virtual topology producer 66 makes a judgement that the search for the lowest value of the region determination value $V_{T\_AVE}$ may have ended, and proceeds to the step S107.

The virtual topology producer 66 compares the end reference update rate with the best region determination value update rate (step S107). When the best region determination value update rate is lower than the end reference update rate (Yes in the step S107), the virtual topology producer 66 makes a judgement that the region determination value $V_{T\_AVE}$ that is lower than the current best region determination value is unlikely to be found, and ends the production of a virtual topology (step S108).

When determining to end the production of a virtual topology, the virtual topology producer 66 specifies the topology corresponding to the lowest region determination value $V_{T\_AVE}$ in the step S40 of FIG. 10. The virtual topology producer 66 outputs the absolute locations of the fixed nodes N-i to N-k obtained from the specified topology as a result of location estimation.

In this manner, the location estimation device 5 estimates the location of each fixed node based on the fixed topology and calculates the region determination value $V_{T\_AVE}$ corresponding to the fixed topology. The location estimation device 5 sets a plurality of distances between virtual nodes, sets a plurality of virtual topologies and estimates the location of each fixed node based on each virtual topology. The location estimation device 5 calculates a region determination value $V_{T\_AVE}$ indicating the frequency of occurrence of a topology conflict in each virtual topology. The location estimation device 5 specifies the lowest region determination value $V_{T\_AVE}$ from the plurality of region determination values $V_{T\_AVE}$, and outputs a result of location estimation based on the topology corresponding to the specified lowest region determination value $V_{T\_AVE}$ as a final result of location estimation. Thus, as compared to the conventional method, the accuracy of location estimation of a fixed node in a stopped state can be improved.

[4. Process of Estimating Location of Moving Nodes (Step S4)]

Figure 21:
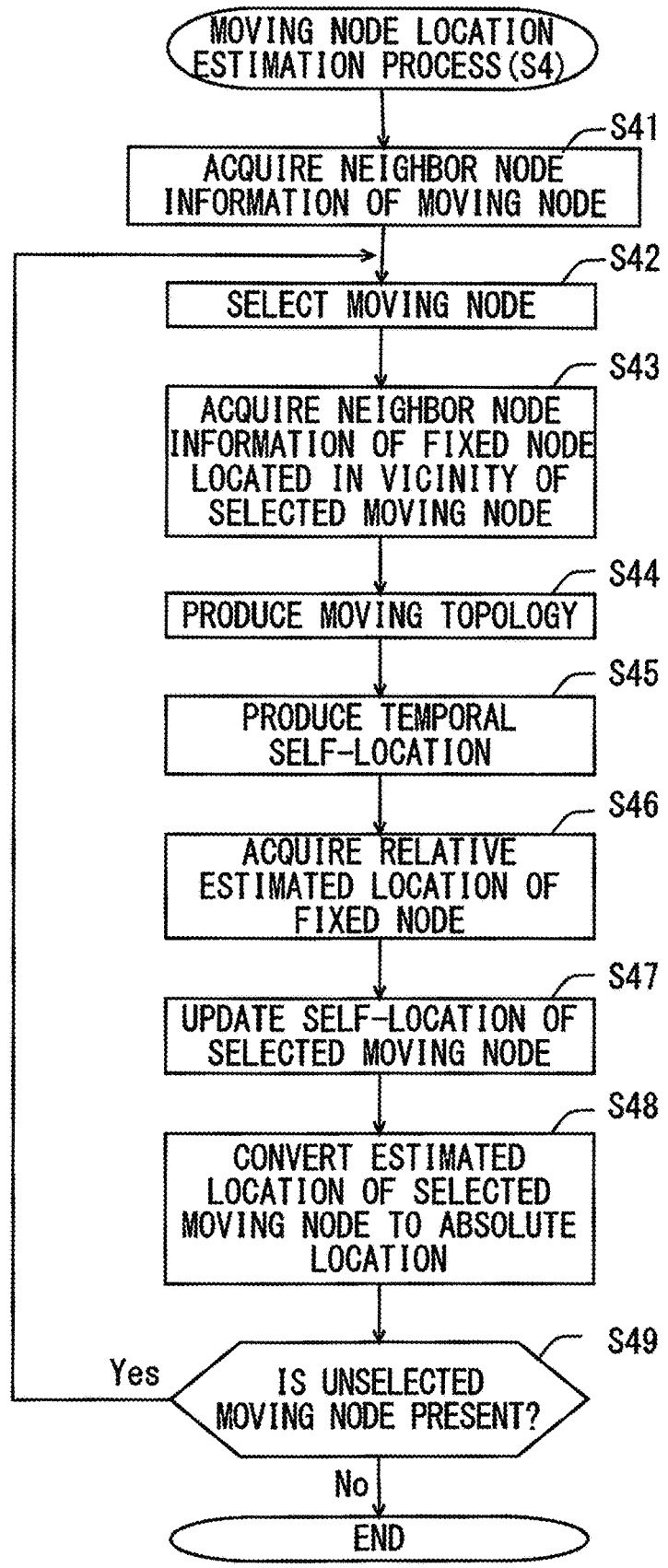
FIG. 21 is a flow chart showing an operation of a moving node location estimator shown in FIG. 6.

FIG. 21 is a flow chart showing the operation of the moving node location estimator 70. Details of the process of estimating the locations of the moving nodes M-1 to M-p (step S4) will be described below with reference to FIG. 21.

[4.1. Selection of Moving Nodes]

The moving node location estimator 70 acquires the neighbor node information of the moving nodes M-1 to M-p that is classified by the classifier 52 (step S41). The moving topology producer 71 identifies the moving nodes M-1 to M-p based on the acquired neighbor node information. The moving topology producer 71 selects a moving node M-u (u is an integer that is equal to or larger than 1 and equal to or smaller than p), the location of which is to be estimated, out of the moving nodes M-1 to M-p (step S42).

[4.2. Production of Moving Topology]

The moving topology producer 71 acquires the neighbor node information of the fixed node that is located in the vicinity of the moving node M-u (step S43). Specifically, the moving topology producer 71 specifies the fixed node recorded in the neighbor node information of the moving node M-u. The moving topology producer 71 acquires the neighbor node information of the specified fixed node from the classifier 52.

For example, when the moving node M-1 is selected in the step S42, the moving topology producer 71 specifies the fixed nodes N-1 and the fixed node N-5 with reference to the neighbor node information 21M shown in FIG. 2 and acquires the neighbor node information of the specified fixed nodes N-1 and N-5 from the classifier 52.

The moving topology producer 71 produces the topology of the moving node M-u (moving topology) based on the neighbor node information of the moving node M-u and the neighbor node information acquired in the step S43 (step S44). The steps of producing a moving topology is the same as the steps of producing a fixed topology (step S32, see FIG. 10). However, the moving topology producer 71 specifies only first vicinity nodes and second vicinity nodes of the moving node M-u and does not specify the vicinity nodes of third or higher order.

That is to say, the moving topology producer 71 produces the topology that records only the first vicinity nodes and the second vicinity nodes of the moving node M-u as the moving topology of the moving node M-u. Further, in the moving topology of the moving node M-u, the first vicinity nodes and the second vicinity nodes are all fixed nodes and do not include a moving node.

Figure 22:
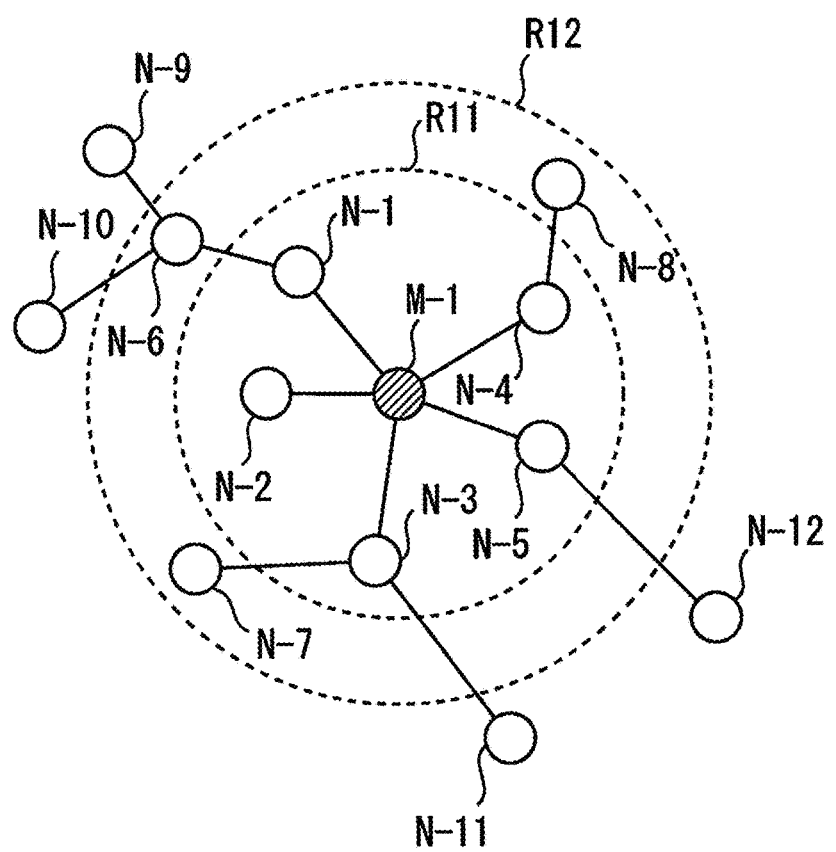
FIG. 22 is a diagram showing one example of a positional relationship between the moving nodes and the fixed nodes shown in FIG. 1.

FIG. 22 is a diagram showing one example of a positional relationship among the moving node M-1 and the fixed nodes N-1 to N-12. The moving topology of the moving node M-1 in the case where the moving node M-1 is selected in the step S42 will be described below with reference to FIG. 22.

As shown in FIG. 22, a region R11 is the coverage of the moving node M-1 and is equivalent to the range in which the first vicinity nodes of the moving node M-1 are set. Therefore, in the moving topology of the moving node M-1, the fixed nodes N-1 to N-5 that are present in the region R11 are set as the first vicinity nodes of the moving node M-1.

The region R12 is equivalent to the range in which the second vicinity nodes of the moving node M-1 are set. In the moving topology of the moving node M-1, the fixed nodes N-6 to N-8 are set as the second vicinity nodes of the moving node M-1. The fixed nodes N-9 to N-12 are outside of the region R12 and equivalent to the third vicinity nodes of the moving node M-u. Therefore, the fixed nodes N-9 to N-12 are not included in the moving topology of the moving node M-1. The fixed nodes N-9 to N-12 are not used for location estimation of the moving node M-1.

That is, the moving topology of the moving node M-u does not broadly constitute the topology of the entire wireless network 10, but topically constitutes the topology with the moving node M-u as the center.

Further, a moving node other than the moving node M-1 is not shown in FIG. 22. The moving topology of the moving node M-1 does not include another moving node that is not the moving node M-1 as a first vicinity node or a second vicinity node. The reason for this is that the location of the moving node is not estimated. Therefore, accuracy of location estimation of the moving node M-1 is degraded when another moving node is included in the moving topology.

[4.3. Update of Temporal Self-Location of Moving Node]

Returning to FIG. 21, the self-location producer 72 randomly produces a temporal self-location $x_u(t)$ of the moving node M-u selected in the step S42 (step S45). The temporal self-location is set on predetermined two-dimensional coordinates. t indicates the number of times the temporal self-location is updated.

The location updater 73 acquires a moving topology from the moving topology producer 71 and acquires the temporal self-location $x_u(t)$ of the moving node M-u from the self-location producer 72. The location updater 73 acquires the relative estimated locations of the first vicinity nodes and the second vicinity nodes from the fixed node location estimator 60 based on the acquired moving topology (step S46).

The location updater 73 updates the acquired temporal self-location $x_u(t)$ a predetermined number of times (step S47). The step of updating the temporal self-location $x_u(t)$ is the same as the step of updating the temporal self-location in the step S35 (see FIG. 10). However, the moving topology records only the first vicinity nodes and the second vicinity nodes, so that n is set to 2 in the above-mentioned formula (2). That is, when the temporal self-location $x_u(t)$ of the moving node is updated, only the formula at the bottom of the formula (2) is used. When the update of the temporal self-location $x_u(t)$ of the moving node M-u ends, the location updater 73 outputs the temporal self-location $x_u(t)$ of the moving node M-u, the update of which has ended, as the estimated location of the moving node M-u.

In the step S47, the locations of the first vicinity nodes and the second vicinity nodes (fixed nodes) set in the moving topology are not updated. This is because the location of the fixed node is already estimated with sufficient accuracy in the process of estimating the location of the fixed node (step S3), and it is not necessary to re-estimate the location of the fixed node in the location estimation of the moving node (step S4).

As described above, in the location estimation of the moving node M-u, the first vicinity nodes and the second vicinity nodes of the moving node are used, and the vicinity nodes of the third or higher order are not used. Thus, a calculation amount required for the location estimation of the moving node can be reduced as compared to the location estimation of a fixed node. In the location estimation of the moving node, traceability accompanied with the movement of the moving node is given higher priority over its accuracy. Therefore, it is possible to quickly estimate the location of the moving node M-u by reducing the number of vicinity nodes used for the location estimation of the moving node M-u.

While the moving topology defines only the first vicinity nodes and the second vicinity nodes by way of example in the above description, the present invention is not limited to this. The moving topology may include vicinity nodes of the third or higher order. However, in consideration of quick estimation of the location of the moving node M-u, when the fixed topology includes the first to the n-th vicinity nodes, the moving topology desirably includes the first to the (n−1)th vicinity nodes. That is, the number of vicinity nodes in the moving topology may be smaller than the number of vicinity nodes in the fixed topology.

[4.4. Conversion of Estimated Location of Moving Node]

The converter 74 receives the temporal self-location ($x_u(t)$) of the updated moving node M-u from the location updater 73. The converter 74 converts the received device estimated location of the moving node M-u into the absolute location using the estimated locations and the absolute locations of an anchor nodes (step S48). The step of converting the estimated location into the absolute location of the moving node M-u in the step S47 is similar to the step S36 (see FIG. 10). The converter 74 outputs the absolute location of the moving node M-u obtained in the step S47 as a result of location estimation of the moving node M-u.

[4.5. Final Judgement in Location Estimation of Moving Node]

After the absolute location of the moving node M-u is output, the moving topology producer 71 determines whether an unselected moving node is present (step S49).

When an unselected moving node is present (Yes in the step S49), the moving topology producer 71 selects a new moving node from among unselected moving nodes (step S42). Thereafter, the location of the newly selected moving node is estimated. When all of the moving nodes are selected (No in the step S49), the moving node location estimator 70 ends the process shown in FIG. 21.

In this manner, when estimating the location of the moving node M-u, the moving node location estimator 70 uses the first vicinity nodes and the second vicinity nodes of the moving node M-u and does not use the vicinity node of the third or higher order. Thus, the calculation amount required for the location estimation of the moving node M-u can be reduced, so that the location of the moving node M-u can be quickly estimated. Further, the moving topology includes fixed nodes as first vicinity nodes and second vicinity nodes and does not include a moving node other than the moving node M-u. Thus, the moving node, the location of which has not been estimated, is not used for the location estimation of the moving node M-u, whereby the accuracy of location estimation of the moving node M-u can be improved.

[4.6. Re-utilization of Neighbor Node Information of Moving Node]

As described above, when the location estimation of the moving node M-u ends, the neighbor node information of the moving node M-u is re-utilized as the neighbor node information of a virtual fixed node. Thus, the number of fixed nodes in the wireless network 10 (see FIG. 1) can be virtually increased, so that the accuracy of location estimation of the wireless nodes in the wireless network 10 can be improved. Details will be described below.

The moving node M-u regularly transmits a notification packet DTG including the neighbor node information while moving with an elapse of time. Therefore, when the moving node is viewed in terms of discrete time, the moving node can be considered as a plurality of fixed nodes at a plurality of different time points.

Figure 23:
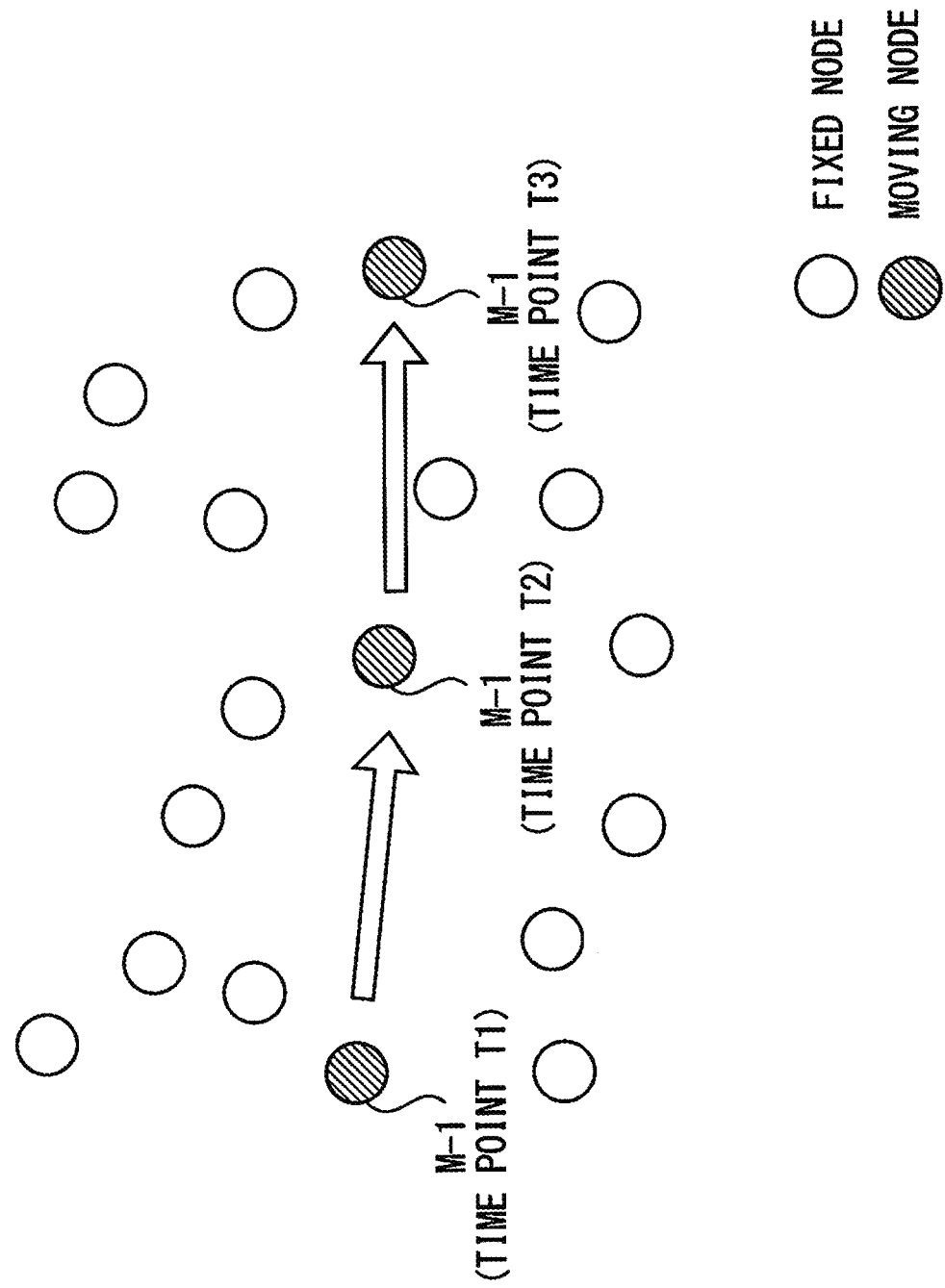
FIG. 23 is a diagram showing one example of a change of a location of a moving node shown in FIG. 1.

FIG. 23 is a diagram showing one example of the change of the location of the moving node M-1. In FIG. 23, only the reference character of the moving node M-1 is shown, and the reference characters of the fixed nodes are not shown.

As shown in FIG. 23, the moving node M-1 moves from the left to the right with an elapse of time. In this case, the location estimation device 5 estimates the location of the moving node M-1 at a time point T1 using the neighbor node information of the moving node M-1 at the time point T1. Thereafter, the location estimation device 5 estimates the location of the moving node M-1 at a time point T2 using the neighbor node information of the moving node M-1 at the time point t2 and estimates the location of the moving node M-1 at a time point T3 using the neighbor node information of the moving node M-1 at the time point T3.

When the location of the moving node M-1 at the time point T2 is estimated, the neighbor node information of the moving node M-1 at the time point T1 is not used. Further, when the location of the moving node M-1 at the time point T3 is estimated, the neighbor node information of the moving node M-1 at the time points T1 and T2 is not used. However, when it is assumed that the fixed nodes are provided at the locations of the moving node M-1 at the time point T1 and the time point T2, the neighbor node information of the moving node M-1 at the time point T1 and T2 can be considered as the neighbor node information produced by this fixed node. That is, when the moving node M-1 is viewed in terms of the discrete time such as time points T1, T2 and T3, the moving node M-1 can be considered as the fixed nodes at these time points.

According to this idea, the location estimation device 5 uses the neighbor node information used for the location estimation of the moving node M-1 as the neighbor node information of the virtual fixed nodes. Specifically, when the location estimation of the moving node M-u is completed, the moving topology producer 71 (see FIG. 8) outputs the neighbor node information of the moving node M-u to the fixed topology producer 61 of the fixed node location estimator 60 (see FIG. 7). When producing a fixed topology, the fixed topology producer 61 uses the neighbor node information of the moving node M-u received from the moving topology producer 71 as the neighbor node information of the virtual fixed node in addition to the neighbor node information of the fixed nodes N-1 to N-k received from the classifier 52.

Thus, the number of fixed nodes in the wireless network 10 can be virtually increased. The accuracy of location estimation of a fixed node is improved as the number of fixed nodes increases. This is because the higher the number of fixed nodes is, the more detailed the fixed topology used for the location estimation of the fixed node becomes.

In this manner, it is possible to treat the past neighbor node information of the moving node M-u as the neighbor node information of virtual fixed nodes by treating the moving node M-u in terms of the discrete time. That is, it is possible to further improve the accuracy of location estimation of the wireless node by treating the moving node M-u as multiplex nodes divided by time.

[4.7. Simulation Evaluation]

(1) Evaluation of Location Accuracy Using Virtual Fixed Nodes

As described above, the fixed node location estimator 60 uses the neighbor node information of the moving node M-u for which the location estimation is completed as the neighbor node information of virtual fixed nodes when estimating the locations of the fixed nodes N-1 to N-k.

Simulation was carried out in order to evaluate the accuracy of location estimation of the fixed node when virtual fixed nodes were used. Specifically, the accuracy of location estimation of the fixed node in the case where virtual fixed nodes were used was compared with the accuracy of location estimation of the fixed node in the case where virtual fixed nodes were not used.

Assuming that a virtual two-dimensional field is used, simulation conditions are as follows. The range of the two-dimensional field is 300 m in length and 300 m in width. The communication radius of wireless nodes including fixed nodes and moving nodes is 1 m. The number of wireless nodes is 50. The number of anchor nodes is 3, and the number of times the temporal self-locations are updated in the location estimation of fixed nodes or moving nodes is 300 times.

Then, a location estimation error of a wireless node in the case where virtual fixed nodes were used was calculated using the following formula (8).

[Formula 8]

$$E_{ave} = \frac{1}{|N|} \sum_{i=1}^{N} |W_i - w_i| \quad (8)$$

In the formula (8), $E_{ave\_1}$ is a location estimation error when virtual fixed nodes are used. N is the number of wireless nodes. $W_i$ is a true location of each of wireless nodes. $w_i$ is an estimated location of each of wireless nodes. The location estimation error $E_{ave\_2}$ in the case where virtual fixed nodes were not used was also calculated using the formula (8).

As a result, the location estimation error $E_{ave\_1}$ generated in the case where the virtual fixed nodes were used was about 11 m. The location estimation error $E_{ave\_2}$ generated in the case where the virtual fixed nodes were not used was about 18 m. The location estimation error $E_{ave\_1}$ generated in the case where the virtual fixed nodes were used was improved to be equal to or smaller than two-thirds of the location estimation error $E_{ave\_2}$ generated in the case where the virtual fixed nodes were not used. That is, it was confirmed that the accuracy of location estimation of a wireless node can be improved by location estimation of the wireless node using virtual fixed nodes.

(2) Change of Location Estimation Error Over Time

As described above, in the location estimation of the wireless node by the location estimation device 5, the frequency of update of an estimated location of a moving node is higher than the frequency of update of an estimated location of a fixed node. For example, the location estimation device 5 estimates the location of a moving node 20 times between the time when estimating the location of a fixed node for the first time and the time when estimating the location of a fixed node for the second time.

Simulation was carried out for evaluation of the change of location estimation error over time when the location estimation of a moving node was repeated as described above. Assuming that a virtual two-dimensional field is used, the simulation conditions are as follows. The range of the two-dimensional field is 300 m in length and 300 m in width. The communication radius of wireless nodes including fixed nodes and moving nodes is 1 m. The number of wireless nodes is 300. Specifically, the number of fixed nodes and the number of moving nodes at the start of location estimation are respectively set to 150. The number of anchor nodes is 3. The number of times temporal self-locations are updated in the location estimation of each of fixed nodes and moving nodes is 300 times. The location estimation of the fixed node was repeated five times, and then the location estimation of the moving node was repeated 25 times.

Further, each time the location of a fixed node or a moving node was estimated, a fixed node was changed to a moving node at a certain probability (0.5), and a moving node was changed to a fixed node. The moving node was randomly moved within the above-mentioned field range. The estimated location of the fixed node that has been changed to the moving node was not used for the location estimation of the moving node.

Then, the location estimation error of a wireless node was calculated using the above-mentioned formula (8) each time the location of a fixed node or the location of a moving node was estimated. In the above-mentioned formula (8), N is the number of wireless nodes including fixed nodes and moving node. $W_i$ is a true location of each of the wireless nodes. $w_i$ is an estimated location of each of the wireless nodes.

Figure 24:
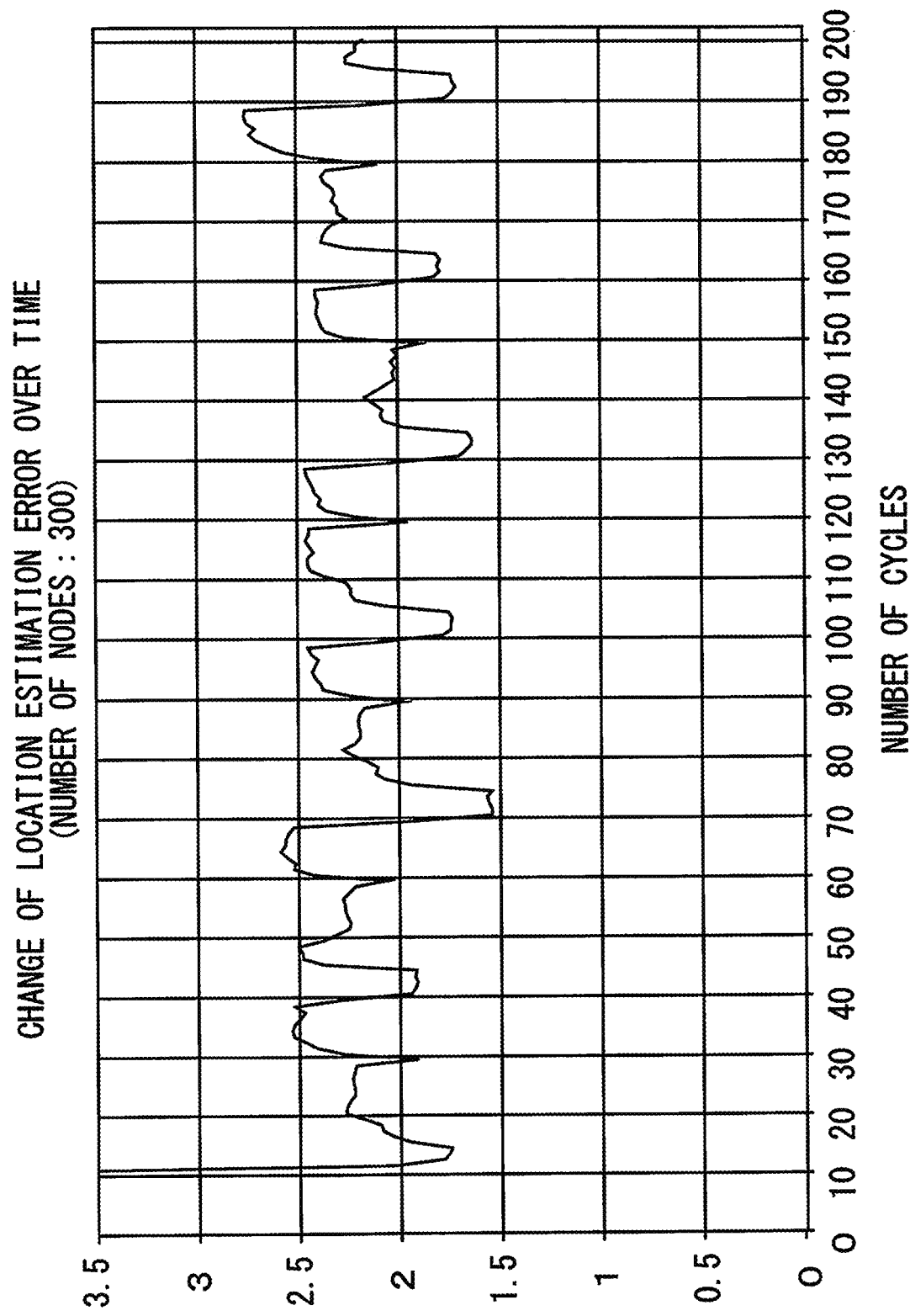
FIG. 24 is a graph showing a result of simulation of the location estimation of the fixed nodes and the moving nodes shown in FIG. 1.

FIG. 24 is the graph showing the change of location estimation error over time by simulation. In FIG. 24, "cycle" of the abscissa indicates the number of times the location of a fixed node or a moving node was estimated.

With reference to FIG. 24, when the number of times the location is estimated is less than 10 times, the location estimation error is equal to or higher than 3.5. When the number of times the location is estimated is from 10 times to 15 times, the location estimation error is reduced to be equal to or smaller than 2.0. This indicates that the accuracy of location estimation of each wireless node is improved when the location estimation is repeated as compared to a state where the location estimation is not carried out.

In FIG. 24, the period during which the location estimation error is reduced to be equal to or smaller than 2.0 m cyclically appears. The period during which the location estimation error is reduced to be equal to or smaller than 2.0 m is the period during which the locations of fixed nodes are estimated. It indicates that the accuracy of location estimation of the fixed nodes is enhanced and the location estimation error is reduced to be equal to or smaller than 2.0 m since reference is made to the neighbor node information of all of the fixed nodes in the location estimation of the fixed nodes.

The period during which the location estimation error is higher than 2.0 corresponds to the period during which the locations of moving nodes are estimated. The location estimation error generated in the period during which the locations of moving nodes are estimated is roughly 2 to 2.5 m. Because a fixed node changes to a moving node at a predetermined probability, the number of fixed nodes that can be utilized for location estimation of moving nodes decreases with an elapse of time. As a result, it is considered that the location estimation error of moving nodes is increased. However, even when the location estimation error of moving nodes is increased, the locations of fixed nodes are regularly estimated. Thus, the location estimation error is reduced to be equal to or smaller than 3 m. That is, it was confirmed that the location estimation error could be reduced to be equal to or smaller than 3 m by regular estimation of locations of fixed nodes when the locations of moving nodes are estimated.

Modified Example

While the moving nodes M-1 to M-p include acceleration sensors by way of example in the above-mentioned embodiment, the present invention is not limited to this. The moving nodes M-1 to M-p may include geomagnetic sensors or gyro sensors instead of the acceleration sensors. That is, the moving nodes M-1 to M-p may include sensors that can make a judgement whether the moving nodes M-1 to M-p are moving.

While wireless nodes and the sink 4 carry out the short-range wireless communication by way of example in the above-mentioned embodiment, the present invention is not limited to this. A wireless node may be compatible with two or more communication standards. For example, a wireless node transmits advertisement packets to and receives advertisement packets from other wireless nodes using BLE or IEEE 802.15.4. Also, a wireless node may transmit a notification packet DTG including the neighbor node information to the sink 4 using wireless communication in accordance with the communication standards (wireless LAN (Local Area Network) or mobile network, for example) with the wireless communication distance longer than that of BLE or IEEE 802.15.4. In the case where the wireless LAN is used when a wireless node transmits a notification packet DTG, the sink 4 corresponds to an access point. In the case where the mobile network is used, the sink 4 corresponds to a base station. The communication standards listed here are only few examples, and the communication standard of wireless communication used by a wireless node is not limited in particular. While the one sink 4 is shown in FIG. 1, the wireless network 10 may include two or more sinks 4.

Further, in the above-mentioned embodiment, a wireless node is not changed from a fixed node to a moving node or from a moving node to a fixed node, byway of example. However, the present invention is not limited to this. As described above, when the acceleration of the moving node M-1 recorded in the neighbor node information 21M of the moving node M-1 is equal to or lower than predetermined acceleration, for example, the classifier 52 may make a judgement that the moving node M-1 is a fixed node, and may output the neighbor node information of the moving node M-1 to the fixed node location estimator 60. In this case, the fixed node location estimator 60 may produce the fixed topology for each of the fixed nodes N-1 to N-k and the fixed topology for the moving node M-1 using the neighbor information of the moving node M-1 in addition to the neighbor node information of the fixed nodes N-1 to N-k. As a result, the location of the moving node M-1 is also estimated in the process of estimating the location of the fixed node (step S3).

Further, a fixed node that is not an anchor node out of the fixed nodes N-1 to N-k may be changed to a moving node. For example, it is assumed that the fixed node N-1 is not an anchor node and includes an acceleration sensor. In this case, the fixed node N-1 produces the neighbor node information recording the acceleration detected by the acceleration sensor. In the location estimation device 5, in the case where the acceleration recorded in the neighbor node information transmitted from the fixed node N-1 is equal to or lower than the predetermined acceleration, the classifier 52 makes a judgement that the fixed node N-1 is not moving. On the other hand, when the acceleration recorded in the neighbor node information transmitted from the fixed node N-1 is higher than the predetermined acceleration, the classifier 52 makes a judgement that the fixed node N-1 is moving, and determines that the fixed node N-1 is be treated as a moving node.

Further, the classifier 52 may determine whether each wireless node is a fixed node or a moving node based on the change of the neighbor node information of each wireless node over time. For example, when acquiring the new neighbor node information of the fixed node N-1, the classifier 52 compares the newly acquired neighbor node information with the neighbor node information of the fixed node N-1 that is acquired immediately before the newly acquired neighbor node information. When the content of the newly acquired neighbor node information is changed from the content of the neighbor node information that is acquired immediately before, the classifier 52 makes a judgement that the fixed node N-1 is moving. On the other hand, when the contents of the newly acquired neighbor node information has not changed from the contents of the neighbor node information acquired immediately before, the classifier 52 makes a judgement that the fixed node N-1 is not moving.

Further, in the above-mentioned embodiment, the virtual topology producer 66 uses the distance calculated based on the absolute coordinates of the fixed node as the distance between virtual nodes to be used for the production of the virtual topology, by way of example. However, the present invention is not limited to this. The virtual topology producer 66 may use LQI (Link Quality Indicator) supported by the IEEE 802.15.4 as the distance between virtual nodes. LQI is a parameter indicating quality of wireless communication such as a packet transmitted from each wireless node and is equivalent to the electric field intensity of each wireless node. For example, the LQI of the moving node M-1 at the time of reception of an advertisement packet may be written in the field of the neighbor nodes in the neighbor node information 21M shown in FIG. 2 in addition to the identification information of wireless nodes. The magnitude of the electric field intensity has a correlation with the wireless communication distance, so that the virtual topology producer 66 can use representative values (an average value and an intermediate value) of all of the LQI recorded in the neighbor node information of each wireless node as an initial value of the distance between virtual nodes.

Further, in the above-mentioned embodiment, the location estimation device 5 may estimate the locations of the fixed nodes N-1 to N-k without using virtual topology. In this case, the calculation amount of the location estimation of the fixed noes N-1 to N-k can be reduced, so that the locations of the moving nodes M-1 to M-p can be quickly estimated.

While the location estimation device 5 estimates the locations of the moving nodes M-1 to M-k in the above-mentioned embodiment, the present invention is not limited to this. The location estimation device 5 does not have to estimate the locations of the moving nodes M-1 to M-p. For example, even when only fixed nodes are arranged in the wireless communication space, the location estimation device 5 can be used.

Figure 25:
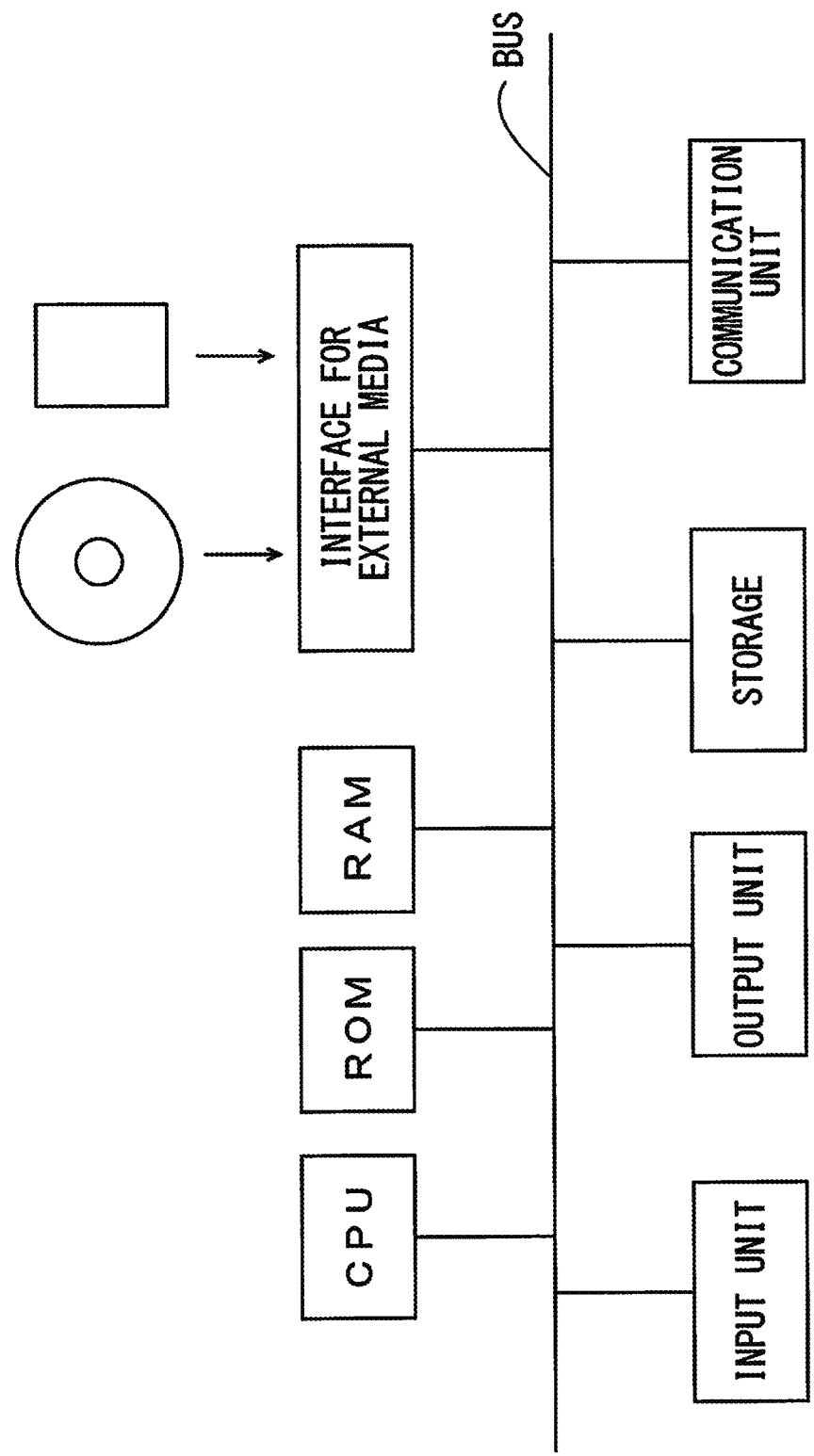
FIG. 25 is a functional block diagram showing another example of a configuration of the location estimation device shown in FIG. 1.

Further, part or all of the processes of each function block (each function part) of the location estimation device 5 according to the above-mentioned embodiment may be implemented by a program. In the location estimation device 5 according to the above-mentioned embodiment 5, part or all of the processes of each function block is executed by a Central Processing Unit (CPU) in a computer. Further, programs for executing respective processes are stored in a storage device such as a hard disc or a ROM and are read in the RAM for execution. For example, the location estimation device 5 has the configuration shown in FIG. 25, so that part or all of the processes of each function block (each function part) of the location estimation device 5 according to the above-mentioned embodiment may be performed.

Further, each process of the above-mentioned embodiment may be executed by hardware or may be executed by software (OS (Operating System) or middleware, alternatively execution together with a predetermined library is included). Further, each process of the above-mentioned embodiment may be executed by a mixed process of software and hardware.

Further, the execution order of the processing method in the above-mentioned embodiment is not limited to the description of the above-mentioned embodiments, and the execution order may be modified without departing the spirit of the present invention.

A computer program that allows the computer to perform the above-mentioned method and a computer-readable recording medium recording the program is included in the scope of the present invention. The computer readable recording medium includes a flexible disc, a hard disc, a CD-ROM, an MO, a DVD, a DVD-ROM, a DVD-RAM, amass storage DVD, a next-generation DVD and a semi-conductor memory, for example.

The above-mentioned computer program is not limited to the one recorded in the above-mentioned recording mediums, and may be transmitted via electric communication line, wireless or wired communication line, a network represented by the Internet and the like.

While the embodiments of the present invention have been explained above, the above-mentioned embodiments are merely examples of description of the present invention. Thus, the present invention is not limited to the above-mentioned embodiments, and the above-mentioned embodiments can be suitably modified without departing the spirit of the present invention.

DESCRIPTION OF THE REFERENCE NUMERALS

N-1 to N-k Fixed Wireless Nodes (Fixed Nodes)
M-1 to M-p Moving Wireless Nodes (Moving Nodes)
4 Sink
5 Position Estimation Device
51 Acquirer
52 Classifier
60 Fixed Node Location Estimator
61 Fixed Topology Producer
62, 72 Self-Location Producers
63, 73 Location Updaters
64, 74 Converters
65 Topology Conflict Determiner
66 Virtual Node Producer
70 Moving Node Location Estimator
71 Moving Topology Generator

The invention claimed is:

1. A location estimation device comprising:
an acquirer that acquires neighbor node information, which is information of first vicinity nodes that are present at a distance of 1 hop from one wireless node, from each of a moving wireless node that moves in a wireless communication space and m (m is an integer that is equal to or larger than 4) fixed wireless nodes that do not move in the wireless communication space;

a fixed node location estimator that estimates locations of the m fixed wireless nodes based on neighbor node information about each of the m fixed wireless nodes; and a moving node location estimator that estimates a location of the moving wireless node based on neighbor node information of the moving wireless node and estimated locations of the m fixed wireless nodes estimated by the fixed node location estimator, wherein the fixed node location estimator includes a fixed topology producer that produces a fixed topology indicating an arrangement relationship among the m fixed wireless nodes based on the neighbor node information about each of the m fixed wireless nodes, a first self-location producer that produces temporal self-locations of the m fixed wireless nodes, and a first location updater that estimates the locations of the m fixed wireless nodes by updating the temporal self-locations of the m fixed wireless nodes based on the fixed topology, and the moving node location estimator includes a moving topology producer that acquires neighbor node information, of a neighbor fixed node that is a fixed wireless node, which is recorded in neighbor node information of the moving wireless node out of the m fixed wireless nodes from the acquirer, and produces a topology of the moving wireless node based on the neighbor node information of the moving wireless node and the neighbor node information of the neighbor fixed node, a second self-location producer that produces a temporal self-location of the moving wireless node, and a second location updater that estimates a location of the moving wireless node by updating a temporal self-location of the moving wireless node based on the moving topology and an estimated location of the neighbor fixed node, and the fixed topology producer sets neighbor node information of the moving wireless node that has already been used for location estimation of the moving wireless node as neighbor node information of a virtual fixed wireless node, and produces a fixed topology based on neighbor node information about each of the m fixed wireless nodes and neighbor node information of the virtual fixed wireless node.

2. The location estimation device according to claim 1, wherein the number of neighbor node information pieces used for production of the moving topology is smaller than the number of neighbor node information pieces used for production of the fixed topology.

3. The location estimation device according to claim 1, wherein the acquirer regularly acquires neighbor node information about each of the m fixed wireless nodes and neighbor node information of the moving wireless node, the fixed node location estimator repeatedly estimates locations of the m fixed wireless nodes in a first period, and the moving node location estimator repeatedly estimates a location of the moving wireless node in a second period that is shorter than the first period.

4. A location estimation program for allowing a computer to estimate a location of a moving wireless node that moves in a wireless communication space, including:

an acquisition step of acquiring neighbor node information that is information of first vicinity nodes that are present at a distance of 1 hop from one wireless node from each of the moving wireless node and m (m is an integer that is equal or larger than 4) fixed wireless nodes that do not move in the wireless communication space;

a fixed node location estimation step of estimating locations of the m fixed wireless nodes based on neighbor node information about each of the m fixed wireless nodes; and a moving node location estimation step of estimating a location of the moving wireless node based on neighbor node information of the moving wireless node and estimated locations of the m fixed wireless nodes estimated in the fixed node location estimation step, wherein the fixed node location estimation step includes a fixed topology production step of producing a fixed topology indicating an arrangement relationship among the m fixed wireless nodes based on the neighbor node information about each of the m fixed wireless nodes, a first self-location production step of producing temporal self-locations of the m fixed wireless nodes, and a first location update step of estimating the locations of the m fixed wireless nodes by updating the temporal self-locations of the m fixed wireless nodes based on the fixed topology, and the moving node location estimation step includes a moving topology production step of acquiring neighbor node information, of the neighbor fixed node that is a fixed wireless node, which is recorded in neighbor node information of the moving wireless node out of the m fixed wireless nodes, and producing a topology of the moving wireless node based on the neighbor node information of the moving wireless node and the neighbor node information of the neighbor fixed node, a second self-location production step of producing a temporal self-location of the moving wireless node, and a second location update step of estimating a location of the moving node by updating the temporal self-location of the moving wireless node based on the moving topology and an estimated location of the neighbor fixed node, and the fixed topology production step sets neighbor node information of the moving wireless node that has already been used for location estimation of the moving wireless node as neighbor node information of a virtual fixed wireless node, and produces a fixed topology based on neighbor node information about each of the m fixed wireless nodes and neighbor node information of the virtual fixed wireless node.

* * * * *